US010191287B2

(12) United States Patent
Yoshida

(10) Patent No.: US 10,191,287 B2
(45) Date of Patent: Jan. 29, 2019

(54) OPTICAL ELEMENT AND DISPLAY DEVICE

(71) Applicant: SEIKO EPSON CORPORATION, Tokyo (JP)

(72) Inventor: Shohei Yoshida, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/854,408

(22) Filed: Dec. 26, 2017

(65) Prior Publication Data
US 2018/0180892 A1 Jun. 28, 2018

(30) Foreign Application Priority Data

Dec. 28, 2016 (JP) .................................. 2016-255070
Oct. 11, 2017 (JP) .................................. 2017-197434

(51) Int. Cl.
G02B 27/01 (2006.01)
G02B 27/14 (2006.01)
F21V 8/00 (2006.01)

(52) U.S. Cl.
CPC ....... G02B 27/0172 (2013.01); G02B 27/145 (2013.01); G02B 6/003 (2013.01); G02B 6/0035 (2013.01); G02B 27/0101 (2013.01); G02B 2027/011 (2013.01); G02B 2027/0125 (2013.01)

(58) Field of Classification Search
CPC .. G02B 27/01; G02B 27/019; G02B 27/0172; G02B 27/1003; G02B 27/017; G02B 27/0178; G02B 6/003; G02B 2027/0172; G02B 2027/0178
See application file for complete search history.

(56) References Cited

U.S. PATENT DOCUMENTS

| 6,829,095 | B2 | 12/2004 | Amitai |
| 8,004,765 | B2* | 8/2011 | Amitai ................. G02B 6/0018 359/618 |
| 2004/0085649 | A1 | 5/2004 | Repetto et al. |
| 2007/0097513 | A1 | 5/2007 | Amitai |
| 2015/0248012 | A1* | 9/2015 | Schowengerdt ..... H04N 13/383 359/627 |

(Continued)

FOREIGN PATENT DOCUMENTS

| JP | 2004-157520 A | 6/2004 |
| JP | 2007-505353 A | 3/2007 |

(Continued)

Primary Examiner — William C Dowling
(74) Attorney, Agent, or Firm — Oliff PLC

(57) ABSTRACT

An optical element includes a plurality of reflectivity variation partially reflecting mirrors and a light-transmittance member, and the plurality of reflectivity variation partially reflecting mirrors have a plurality of regions having different reflectivity in an inclination direction. The plurality of regions include at least a low reflectivity region positioned on a side far away from an emission surface and a high reflectivity region positioned on a side close to the emission surface. An occupation area of the high reflectivity region of the reflectivity variation partially reflecting mirror positioned far away from an incidence portion is larger than an occupation area of the high reflectivity region of the reflectivity variation partially reflecting mirror positioned on a side close to the incidence portion.

20 Claims, 17 Drawing Sheets

(56) References Cited

U.S. PATENT DOCUMENTS

| | | | |
|---|---|---|---|
| 2017/0219830 A1* | 8/2017 | Komatsu | G02B 17/086 |
| 2018/0180884 A1* | 6/2018 | Yoshida | G02B 27/0172 |
| 2018/0203237 A1* | 7/2018 | Shih | G02B 27/0172 |
| 2018/0210202 A1* | 7/2018 | Danziger | G02F 1/295 |

FOREIGN PATENT DOCUMENTS

| | | | |
|---|---|---|---|
| JP | 6843043 B1 | 1/2016 |
| WO | 2005/024969 A2 | 3/2005 |
| WO | 2016/088389 A1 | 6/2016 |

\* cited by examiner

OPTICAL ELEMENT AND DISPLAY DEVICE

BACKGROUND

1. Technical Field

The present disclosure relates to an optical element and a display device.

2. Related Art

Recently, an image display device of a type used by being worn on the head of an observer such as a head-mounted display is provided as one of wearable information devices. In addition, there is also known an image display device capable of simultaneously viewing both an image generated by a display element and an external image of the observer when the observer wears the image display device, that is, a so-called see-through type image display device.

For example, JP-T-2007-505353 discloses an optical device including a substrate with light transmittance, a display light source, optical means for combining light which is incident on the substrate by internal reflection and is in a field of view, and a partial reflection surface which is provided within the substrate and is disposed obliquely with respect to a main surface of the substrate. In addition, JP-A-2004-157520 discloses a see-through type display device system including an image generating device and a light guiding member including an image pickup system configured with a diffraction grating.

In the head-mounted display including the optical device disclosed in JP-T-2007-505353 and the display device system disclosed in JP-A-2004-157520, there is a problem hat striped display unevenness is viewed due to a pattern of the partial reflection surface provided in front of the eye of the observer. In addition, in the patent documents, it is described that uniformity of brightness can be improved and display unevenness can be eliminated by providing a region having different reflectivity in one partial reflection surface, but effects thereof are insufficient.

SUMMARY

An advantage of some aspects of the embodiment is to provide a display device which can reduce viewing of striped display unevenness. In addition, another advantage of some aspects of the embodiment is to provide an optical element which is appropriately used for the display device.

According to an aspect of the embodiment, an optical element includes a plurality of reflectivity variation partially reflecting mirrors that are provided so as to be parallel to each other with a space therebetween, reflect a part of image light incident from an incidence portion, and make the other part of the image light transmit therethrough; and a light-transmittance member that supports the plurality of reflectivity variation partially reflecting mirrors. The light-transmittance member includes an incidence surface on which the image light is incident and an emission surface from which the image light is emitted. Each of the plurality of reflectivity variation partially reflecting mirrors is disposed to be inclined with respect to the incidence surface and the emission surface. The plurality of reflectivity variation partially reflecting mirrors include a plurality of regions having different reflectivity in an inclination direction. The plurality of regions of each of the plurality of reflectivity variation partially reflecting mirrors include at least a low reflectivity region that is positioned on a side far away from the emission surface in the inclination direction and a high reflectivity region that is positioned on a side closer to the emission surface than the low reflectivity region in the inclination direction and has a higher reflectivity than reflectivity of the low reflectivity region. An occupation area of the high reflectivity region in the reflectivity variation partially reflecting mirror that is positioned on a side far away from the incidence portions is larger than an occupation area of the high reflectivity variation region of the reflectivity variation partially reflecting mirror that is positioned on a side close to the incidence portions in the plurality of reflectivity variation partially reflecting mirrors.

In the optical element, an image light proceeding on a side far away from an incidence portion is incident on a partially reflecting mirror at a more nearly perpendicular angle than an image light proceeding to a side close to the incidence portion, and varies a proceeding direction while being branched by a larger number of partially reflecting mirrors. Accordingly, the image light proceeding on the side far away from the incidence portion has a remarkable reduction in intensity when passing through the partially reflecting mirror, compared with the image light proceeding on the side close to the incidence portion.

Incidentally, in this case, an occupation area of a high reflectivity region in a reflectivity variation partially reflecting mirror on a side far away from an incidence portion is larger than an occupation area of a high reflectivity region in a reflectivity variation partially reflecting mirror on a side close to the incidence portion. In other words, a variation position of reflectivity in one partially reflecting mirror is set at a position distant from an emission surface (observer) than a side close to the incidence portion, on the side far away from the incidence portion. Thereby, it is possible to approximate a decrease of intensity of image light proceeding on the side far away from the incidence portion to a degree of intensity decrease of image light proceeding on the side close to the incidence portion. Thereby, it is possible to make an intensity distribution of light emitted from the optical element uniform.

In the optical element, the occupation area of each of the high reflectivity regions in the plurality of reflectivity variation partially reflecting mirrors may gradationally increase from the side close to the incidence portion toward the side far away from the incidence portion.

In the configuration, an optical element having a uniform intensity distribution of emitted light can be produced by a simple manufacturing method.

In the optical element, the occupation area of each of the high reflectivity regions in the plurality of reflectivity variation partially reflecting mirrors may linearly increase from the side close to the incidence portion toward the side far away from the incidence portion.

In the configuration, an optical element having a uniform intensity distribution of emitted light can be produced by a simple manufacturing method.

In the optical element, when reflectivity of the high reflectivity region is referred to as $R_1$, reflectivity of the low reflectivity region is referred to as $R_2$, and a reflectivity difference parameter $\Phi$ is defined by following equation (1) of $\Phi=(R_1-R_2)/[(R_1+R_2)/2]$, the reflectivity difference parameter $\Phi$ may satisfy $0.1<\Phi<0.7$ . . . (1).

In the configuration, it is possible to reduce an amplitude of an intensity of emitted light to the extent that an observer cannot recognize intensity unevenness.

The optical element may further include a reflectivity constant partially reflecting mirrors provided in parallel with each of the plurality of reflectivity variation partially reflecting mirrors.

In the configuration, manufacturing cost of the optical element can be reduced. Particularly, if arrangement and the number of the reflectivity constant partially reflecting mirrors are properly set, it is possible to suppress deterioration of characteristics of the optical element and to reduce manufacturing cost of the optical element.

In the optical element, a partially reflecting mirror having constant reflectivity may be disposed so as to be parallel to the plurality of reflectivity variation partially reflecting mirrors between two adjacent reflectivity variation partially reflecting mirrors among the plurality of reflectivity variation partially reflecting mirrors.

In the configuration, intensity distribution of light emitted from the optical element can be uniform.

In the optical element, the high reflectivity regions and the low reflectivity regions in the plurality of reflectivity variation partially reflecting mirrors may linearly vary.

In the configuration, intensity distribution of light emitted from the optical element can be uniform.

According to another aspect of the embodiment, a display device includes an image forming device, and a light guiding device that guides image light that is generated by the image forming device. The light guiding device includes an incidence portion on which the image light is incident, a light guiding body which guides the image light incident from the incidence portion, and an emission portion from which the image light is emitted. The emission portion includes the optical element according to an aspect of the embodiment.

In this case, the display device includes an emission portion having an optical element with more uniform intensity distribution of emitted light, and thus, it is possible to realize a display device in which striped display unevenness is hard to be viewed.

In the display device, the emission portion may be provided on a surface on a side on which the light guiding body is viewed.

In the configuration, it is possible to realize a display device which is easy to be designed.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

First Embodiment

Hereinafter, a first embodiment will be described with reference to FIGS. 1 to 9D.

A display device according to the first embodiment is used as, for example, a head-mounted display.

Figure 1:
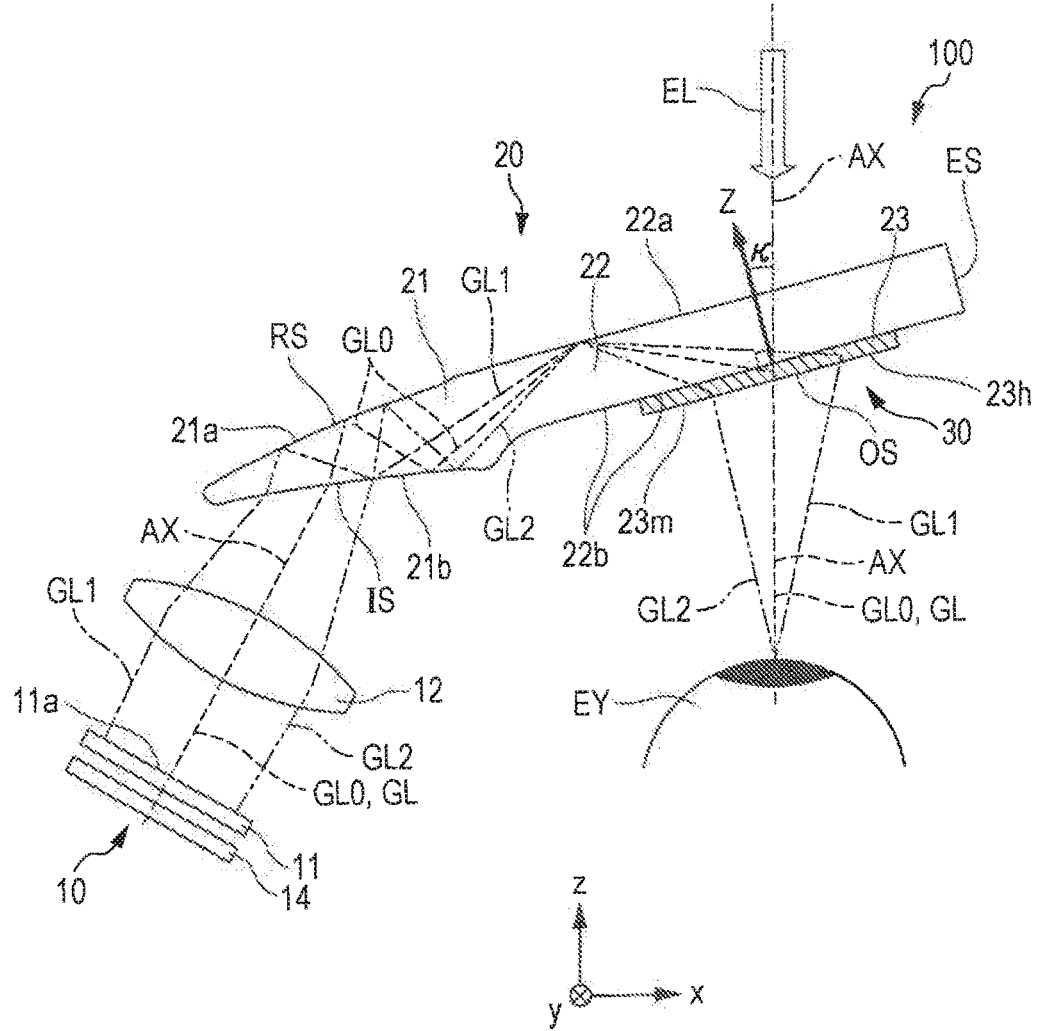
FIG. 1 is a plan view of a display device according to a first embodiment.
Figure 2:
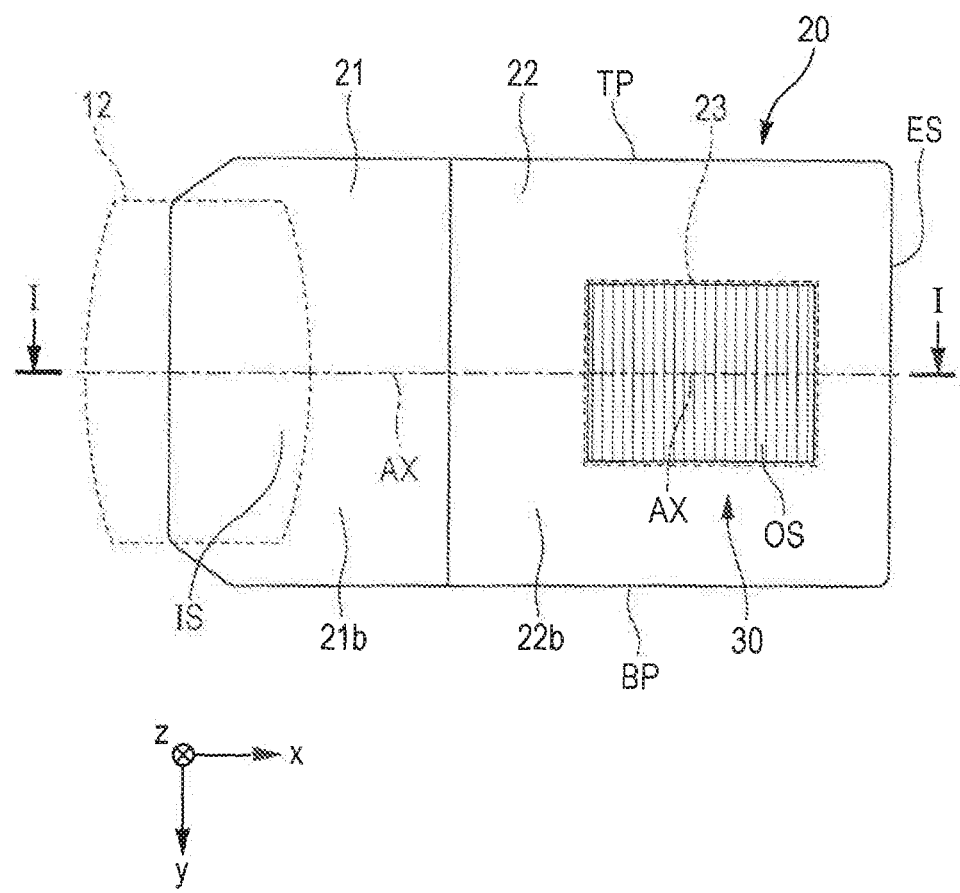
FIG. 2 is a rear view of a light guiding device.
Figure 3:
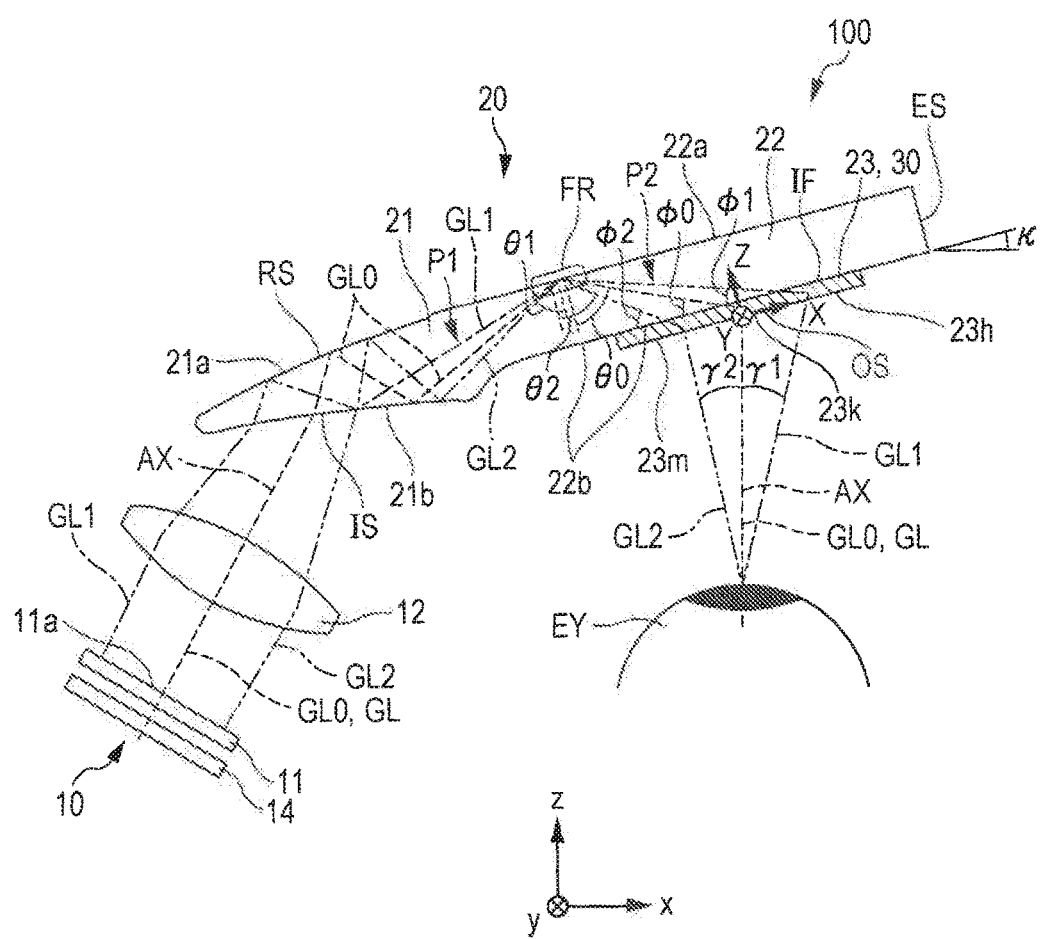
FIG. 3 is a view illustrating a light path of image light in the light guiding device.

FIG. 1 is a plan view of the display device according to the first embodiment. FIG. 2 is a rear view of a light guiding device. FIG. 3 is a view illustrating a light path of image light in the light guiding device.

In the following drawings, scales of dimensions may be changed by configuration elements so as to make each configuration element be easily viewed.

Overall Configuration of Light Guiding Device and Display Device

As illustrated in FIG. 1, the display device 100 includes an image forming device 10 and a light guiding device 20. FIG. 1 corresponds to a cross section I-I of the light guiding device 20 illustrated in FIG. 2.

The display device 100 allows the observer to view a display image as a virtual image and allows an observer to observe an external image in a see-through manner. The display device 100 includes the image forming device 10 and the light guiding device 20 which are provided by one pair in correspondence with the right eye and the left eye of the observer. However, since a device for the right eye and a device for the left eye are bilaterally symmetrical, only the device for the left eye is illustrated here, and illustration of the device for the right eye is omitted. The display device 100 has a temples unit (not illustrated) that the observer hangs on his ear, and has an appearance like, for example, general eyeglasses as a whole.

The image forming device 10 includes a liquid crystal panel 11 and a projection lens 12. The liquid crystal panel 11 spatially modulates illumination light from a light source 14, and forms image light GL to become a video image or a display target. The projection lens 12 is configured with a collimator lens which converts the image light GL emitted from each point on the liquid crystal panel 11 into substantially parallel rays. The projection lens 12 is formed of glass or plastic, and is not limited to one piece, and may be configured with a plurality of lenses. The projection lens 12 is not limited to a spherical lens, and may be an aspherical lens, a freeform surface lens, or the like.

The light guiding device 20 includes a light-transmittance member of a flat shape. The light guiding device 20 emits the image light GL formed by the image forming device 10 as virtual image light toward an eye EY of an observer, while transmitting external light EL configuring an external image to lead to the eye EY of the observer. The light guiding device 20 includes an incidence portion 21 on which image light is incident, a parallel light guiding body 22 that mainly guides the image light, and an emission portion 23 that emits the image light GL and the external light EL. The parallel light guiding body 22 and the incidence portion 21 are integrally formed of a resin material with high light transmittance. In the first embodiment, the light path of the image light GL propagating through the light guiding device 20 is configured with a light path of one type that reflects light in the same number of times, and may not be a combination of a plurality of types of light paths.

The parallel light guiding body 22 is disposed to be inclined with respect to the light axis AX which uses the eye EY of the observer as a reference. A normal direction Z of a flat surface 22a of the parallel light guiding body 22 is inclined by an angle κ with respect to the light axis AX. Thereby, the parallel light guiding body 22 can be disposed along a front surface of the face, and a normal line of the flat surface 22a of the parallel light guiding body 22 is inclined with respect to the light axis AX. As such, in a case where the normal line of the flat surface 22a of the parallel light guiding body 22 is inclined by the angle κ with respect to the z direction parallel to the light axis AX, the image light GL0 on and around the light axis AX which is emitted from the optical element 30 forms an angle κ with respect to the normal line of the light emission surface OS.

The incidence portion 21 includes a light incident surface IS that takes the image light GL from the image forming device 10 into the incidence portion 21, and a reflection surface RS that reflects the image light GL taken into the incidence portion 21 and guides to the inside of the parallel light guiding body 22. The light incident surface IS is formed of a curved surface 21b that is a concave in the projection lens 12. The curved surface 21b also has a function of totally reflecting the image light GL reflected by the reflection surface RS on the inner surface side.

The reflection surface RS is formed of a curved surface 21a that is a concave in the projection lens 12. The reflection surface RS is formed of a metal film such as an aluminum film formed on the curved surface 21a by an evaporation method or the like. The reflection surface RS reflects the image light GL incident from the light incident surface IS and bends the light path. The curved surface 21b totally reflects the image light GL reflected by the reflection surface RS on the inner side and bends the light path. As such, the incidence portion 21 reflects the image light GL incident from the light incident surface IS twice and bends the light path, thereby reliably guiding the image light GL to the inside of the parallel light guiding body 22.

The parallel light guiding body 22 is a light guiding member of a flat shape parallel to the y axis and inclined with respect to the x axis, and is also referred to as a light guiding body. The parallel light guiding body (light guiding body) 22 is formed of a resin material and the like with light transmittance. The parallel light guiding body 22 includes a pair of flat surfaces 22a and 22b substantially parallel to each other. Since the flat surfaces 22a and the flat surface 22b are parallel flat surfaces, neither enlargement nor focus shift of an external image are made. The flat surface 22a functions as a total reflection surface that totally reflects the image light from the incidence portion 21, and guides the image light GL to the emission portion 23 with a small loss. The flat surface 22a is disposed on an external side of the parallel light guiding body 22 and functions as a first total reflection surface, and is also referred to as an external side surface in the specification.

The flat surface 22b is also referred to as an observer side surface in the specification. The flat surface 22b (observer side surface) extends to one end of the emission portion 23. Here, the flat surface 22b is a boundary IF between the parallel light guiding body 22 and the emission portion 23 (refer to FIG. 3).

In the parallel light guiding body 22, the image light GL reflected by the reflection surface RS or the light incident surface IS of the incidence portion 21 is incident on the flat surface 22a which is a total reflection surface, is totally reflected by the flat surface 22a, and is guided to a +x side or an X side on which a back side of the light guiding device 20, that is, the emission portion 23 is provided. As illustrated in FIG. 2, the parallel light guiding body 22 has a vertical end surface ES as an end surface of the +x side in an outer shape of the light guiding device 20. In addition, the parallel light guiding body 22 has an upper end surface TP and a lower end surface BP as end surfaces on the ±y side.

As illustrated in FIG. 3, coordinate axes obtained by rotating the coordinate axes configured by the x axis, the y axis and the z axis in the counterclockwise direction by the angle κ around the y axis are referred to as the X axis, the Y axis, and the Z axis, respectively.

As illustrated in FIG. 3, the emission portion 23 is formed in a plate shape along the flat surface 22b or the boundary IF on the back side (+x side) of the parallel light guiding body 22. When the image light GL totally reflected by a region FR of the flat surface (total reflection surface) 22a on the external side of the parallel light guiding body 22 is allowed to pass through, the emission portion 23 reflects the incident image light GL at a predetermined angle and bends toward the light emission surface OS side. Here, the image light GL, which is first incident to the emission portion 23 without passing through the emission portion, is a target to be emitted as virtual image light. That is, although there is light reflected by an inner surface of the light emission surface OS in the emission portion 23, the light is not used as image light.

The emission portion 23 includes an optical element 30 in which a plurality of partially reflecting mirrors 31 with light transmittance and light reflectance are arranged. A structure of the optical element 30 will be described in detail below with reference to FIG. 4 and the like. The optical element 30 is provided along the flat surface 22b of the parallel light guiding body 22 on the observer side. As such, the emission portion 23 is provided on a surface on a viewing side of the parallel light guiding body 22.

Since the light guiding device 20 has the aforementioned structure, a light path of the image light GL emitted from the image forming device 10 and incident on the light guiding device 20 from the light incident surface IS is bent by multiple reflections caused by the incidence portion 21, and the image light is totally reflected in the region FR of the flat surface 22a of the parallel light guiding body 22 and proceeds substantially along the light axis AX. The image light GL reflected by the region FR of the flat surface 22a on the +z side is incident on the emission portion 23.

At this time, a width of the region FR in the longitudinal direction is narrower than a width of the emission portion 23 in the longitudinal direction, in an xy plane. That is, an incidence width in which a light ray flux of rays of the image light GL is incident on the emission portion 23 (or the optical element 30) is wider than an incidence width in which a light ray flux of the image light GL is incident on the region FR. As such, by relatively narrowing the incidence width in which a light ray flux of the image light GL is incident on the region FR, interference of the light path is less likely to occur, and the boundary IF is not used for guiding, that is, it is easy for the image light GL from the region FR to be directly incident on the emission portion 23 (or the optical element 30) without reflecting the image light GL at the boundary IF.

As the image light GL incident on the emission portion 23 is bent at an appropriate angle in the emission portion 23, the image light can be emitted, and is finally emitted from the light emission surface OS. The image light GL emitted from the light emission surface OS is incident on the eye EY of an observer as virtual image light. As the virtual image light forms an image on the retina of the observer, the observer can view the virtual image due to the image light GL.

Here, an angle in which the image light GL used for image formation is incident on the emission portion 23 increases as the image light moves apart from the incidence portion 21 on the light source side. That is, the image light GL which is largely inclined with respect to the Z direction parallel to the flat surface 22a on the external side or the light axis AX is incident on the back side of the emission portion 23 and is bent at a relatively large angle, and the image light GL which is slightly inclined with respect to the Z direction or the light axis AX is incident on a front side of the emission portion 23 and is bent at a relatively small angle.

Light Path of Image Light

Hereinafter, the light path of the image light GL will be described in detail.

As illustrated in FIG. 3, components emitted from a central portion of an emission surface 11a denoted by a dashed line, in the image light respectively emitted from the emission surface 11a of the liquid crystal panel 11, is defined as image light GL0, and components emitted from the left side (−x and +z side) of a paper surface, in the periphery of the emission surface 11a denoted by an alternate long and short dash line, is defined as image light GL1, and components emitted from the right side (+x and −z side) of the paper surface, in the periphery of the emission surface 11a denoted by a two-dotted chain line, is defined as image light GL2. The light path of the image light GL0 among those is assumed to extend along the light axis AX.

The image lights GL0, GL1, and GL2 that pass through the projection lens 12 are respectively incident from the light incident surface IS of the light guiding device 20, and then proceeds to the emission portion 23 by passing through the inside of the parallel light guiding body 22 via the incidence portion 21. Specifically, the image light GL0 emitted from the central portion of the emission surface 11a among the image lights GL0, GL1, and GL2 is bent by the incidence portion 21 and is coupled in the parallel light guiding body 22, and then, is incident on the region FR of the one flat surface 22a at a standard reflection angle θ0 and is totally reflected, passes through the boundary IF without being reflected by the boundary IF between the parallel light guiding body 22 and the emission portion 23 (or the optical element 30), and is directly incident on the central portion 23k of the emission portion 23. The image light GL0 is reflected at a predetermined angle in the portion 23k and is emitted as parallel light flux in a direction (direction of an angle κ with respect to the Z direction) of the light axis AX inclined with respect to the XY plane including the light emission surface OS from the light emission surface OS.

The image light GL1 emitted from one end side (−x side) of the emission surface 11a is bent by the incidence portion 21 and is coupled in the parallel light guiding body 22, and then, is incident on the region FR of the flat surface 22a at a maximum reflection angle θ1 and is totally reflected, passes through the boundary IF without being reflected by the boundary IF between the parallel light guiding body 22 and the emission portion 23 (or the optical element 30), is reflected at a predetermined angle in a portion 23h of the back side (+x side), in the emission portion 23, and is emitted as a parallel light flux from the light emission surface OS at a predetermined angle direction. At this time, in an emission angle γ1, an angle returning to the incidence portion 21 side is relatively large.

Meanwhile, the image light GL2 emitted from the other end side (+x side) of the emission surface 11a is bent by the incidence portion 21 and coupled in the parallel light guiding body 22, and then, is incident on the region FR of the flat surface 22a at a minimum reflection angle θ2 and is totally reflected, passes through the boundary IF without being reflected by the boundary IF between the parallel light guiding body 22 and the emission portion 23 (or the optical element 30), is reflected at a predetermined angle in a portion 23m of an entrance side (−x side) in the emission portion 23, and is emitted as a parallel light flux from the light emission surface OS in a predetermined angular direction. At this time, in an emission angle γ2, an angle returning to the incidence portion 21 side is relatively small.

Although the image lights GL0, GL1, and GL2 are described as representative of a part of the overall rays of the image light GL, but light components configuring the other image light GL are also guided in the same manner as the image light GL0 and the like, and are emitted from the light emission surface OS. Accordingly, illustration and description of these will be omitted.

Here, a value of a critical angle θc is θc≈45.6° on the assumption that n=1.4 as an example of a value of a refractive index n of a transparent resin material used for the incidence portion 21 and the parallel light guiding body 22. As the minimum reflection angle θ2 among the reflection angles θ0, θ1, and θ2 of the image lights GL0, GL1, and GL2 is set to a value larger than the critical angle θc, it is possible to satisfy total reflection conditions for necessary image light.

The image light GL0 directed to the center is incident on a portion 23$k$ of the emission portion 23 at an elevation angle φ0 (=90°−θ0). The image light GL1 directed to the periphery is incident on the portion 23$h$ of the emission portion 23 at an elevation angle φ1 (=90°−θ1). The image light GL2 directed to the periphery is incident on a portion 23$m$ of the emission portion 23 at an elevation angle φ2 (=90°−θ2). Here, a relationship of φ2>φ0>φ1 is established between the elevation angles φ0, φ1, and φ2, by reflecting a magnitude relationship of the reflection angles θ0, θ1, and θ2. That is, an incidence angle ι (refer to FIG. 4) on the partially reflecting mirror 31 of the optical element 30 gradually decreases in the order of the portion 23$m$ corresponding to the elevation angle φ2, the portion 23$k$ corresponding to the elevation angle φ0, and the portion 23$h$ corresponding to the elevation angle φ1. In other words, the incidence angle ι on the partially reflecting mirror 31 or the reflection angle ε by the partially reflecting mirror 31 decreases as the light moves apart from the incidence portion 21.

An overall behavior of the light ray flux of the image light GL reflected by the flat surface 22$a$ on the external side of the parallel light guiding body 22 toward the emission portion 23 will be described.

As illustrated in FIG. 3, the light ray flux of the image light GL has a width being narrowed in any one of straight light paths P1 and P2 before and after being reflected by the region FR on the external side of the parallel light guiding body 22, in a cross section including the light axis AX. Specifically, the light ray flux of the image light GL has a width being narrowed and a beam width being narrowed as a whole at a position which straddles the straight light paths P1 and P2 in the vicinity of the region FR, that is, in the vicinity of the boundary between the straight light paths P1 and P2, in a cross section including the light axis AX. Thereby, the light ray flux of the image light GL is narrowed in front of the emission portion 23, and a viewing angle in the lateral direction is widened relatively and easily.

In the described example, the width and the beam width of the image light GL are narrowed at a position which straddles the straight light paths P1 and P2, but the width and the beam width may be narrowed only on one side of the straight light paths P1 and P2.

Configuration of Optical Element

Hereinafter, a configuration of the optical element 30 configuring the emission portion 23 will be described with reference to FIG. 3 and FIG. 4.

As illustrated in FIG. 3, the emission portion 23 is configured by the optical element 30 provided on a viewing side surface of the parallel light guiding body 22. Therefore, the emission portion 23 is provided along the XY plane inclined by an angle κ with respect to the light axis AX in the same manner as the parallel light guiding body 22.

The optical element 30 includes a plurality of partially reflecting mirrors 31 and a plurality of light-transmittance members 32. The optical element 30 has a configuration in which the partially reflecting mirror 31 is interposed between adjacent two light-transmittance members 32 among the plurality of light-transmittance members 32. In other words, the optical element 30 has a configuration in which the partially reflecting mirrors 31 and the light-transmittance members 32 are alternately arranged.

At least a part of the plurality of partially reflecting mirrors 31 is configured by a plurality of reflectivity variation partially reflecting mirrors. The reflectivity variation partially reflecting mirror has a plurality of regions having different reflectivity in an inclination direction. In the present embodiment, all the partially reflecting mirrors 31 are configured by the reflectivity variation partially reflecting mirrors. However, all the partially reflecting mirrors 31 may not be configured by the reflectivity variation partially reflecting mirrors, and partially reflecting mirrors with constant reflectivity may be mixed. In the present embodiment, since there is no need to distinguish between the reflectivity variation partially reflecting mirror and the constant reflectivity partially reflecting mirror, the reflectivity variation partially reflecting mirror will be simply referred to as the partially reflecting mirror in the following description.

Figure 4:
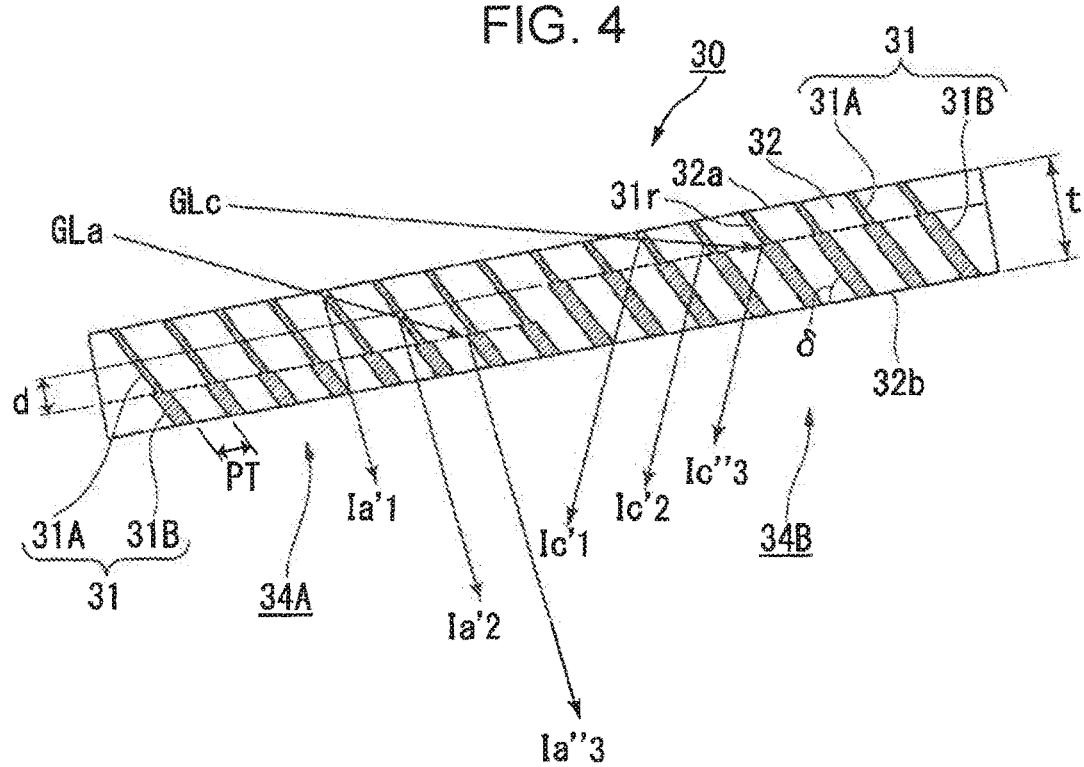
FIG. 4 is a sectional view of an optical element according to the first embodiment.

As illustrated in FIG. 4, the light-transmittance member 32 is a columnar member having a parallelogram-shaped sectional shape perpendicular to the longitudinal direction. Therefore, the light-transmittance member 32 has two sets of a pair of flat surfaces extending in parallel in the longitudinal direction and parallel to each other. Among one pair of flat surfaces of the two sets, one flat surface of the one set is an incidence surface 32$a$ on which the image light GL and the external light EL are incident, the other flat surface of the one set is an emission surface 32$b$ from which the image light GL and the external light EL emit. In addition, the partially reflecting mirror 31 including two regions 31A and 31B having different film thicknesses is provided on one flat surface of the other set. The light-transmittance member 32 is formed of, for example, glass, transparent resin, or the like.

The plurality of light-transmittance members 32 are all configured to have the same shape and the same dimension. Accordingly, if a plurality of sets, each set being configured by a pair of the light-transmittance member 32 and the partially reflecting mirror 31, are bonded to each other, the plurality of partially reflecting mirrors 31 are arranged in parallel to each other at equal pitches. While not illustrated in FIG. 4, an adhesive layer is provided between one surface of the partially reflecting mirror 31 and the adjacent light-transmittance member 32. Thereby, the optical element 30 becomes a rectangular plate-shaped member as a whole. If the optical element 30 is viewed from a normal direction of the incidence surface 32$a$ or the emission surface 32$b$ of the light-transmittance member 32, a plurality of thin band-shaped partially reflecting mirrors 31 are arranged in a stripe shape. That is, the optical element 30 has a configuration in which a plurality of rectangular partially reflecting mirrors 31 are arranged at a predetermined space (pitch PT) in an extending direction of the parallel light guiding body 22, that is, in the X direction.

As illustrated in FIG. 4, one surface of the partially reflecting mirror 31 is a planarized surface and the other surface is a surface having a step difference in film thickness difference, and thereby, strictly speaking, it is difficult to say that the adjacent partially reflecting mirrors 31 are parallel to each other. However, in the embodiment, when the flat surface passing through the center of the film thickness direction of the partially reflecting mirror 31 or at least one of the surfaces of the partially reflecting mirror 31 is parallel, it is considered that the plurality of partially reflecting mirrors 31 are parallel to each other. Since the partially reflecting mirror 31 is configured by a thin film and the film thickness difference is also slight, it can be said that the plurality of partially reflecting mirrors 31 are parallel to each other if the film thickness difference is ignored.

In addition, in a case where light of the same angle is incident on the plurality of partially reflecting mirrors 31, if an angular difference between the lights reflected from the respective partially reflecting mirrors 31 cannot be viewed by an observer, the plurality of partially reflecting mirrors 31 are regarded as parallel to each other. As an example, in a case where visual acuity of an observer is 1.0, the observer has a resolution of 1/60 degree, and thus, if an angular difference between the lights reflected from the respective partially reflecting mirrors 31 is 1/120 degree which is a half angle thereof, the observer cannot view the difference, and it is considered that the plurality of partially reflecting mirrors 31 are parallel to each other. In addition, as another example, if the angular difference between the lights reflected from the respective partially reflecting mirrors 31 is less than or equal to half of the angular difference between the pixels of the image forming device 10, the observer cannot viewed the difference, and it is considered that the plurality of partially reflecting mirrors 31 are parallel to each other. For example, in a case where the left and right angles of view of the image light GL are 30 degrees and the numbers of pixels on the left and right are 1280 pixels, an angle of half of the pixel is 30÷1280÷2=0.012, and thus, if half of the angular difference is less than or equal to 0.006 degrees, it is considered that the partially reflecting mirrors are parallel to each other.

The partially reflecting mirror 31 is configured by a reflective film interposed between the light-transmittance members 32. For example, a metal film with high reflectivity such as aluminum is used as the reflective film. Since a thickness of the reflective film is sufficiently small, the partially reflecting mirror 31 reflects a part of the image light GL and the external light EL incident on the optical element 30, and transmits the other part of the image light GL and the external light EL. A dielectric multilayer film in which a plurality of dielectric thin films with different refractive indices are alternately stacked may be used as the reflection film, in addition to the metal film.

In the partially reflecting mirror 31, a short side thereof is provided so as to be inclined with respect to the incidence surface 32a and the emission surface 32b of the partially reflecting mirror 31. More specifically, the partially reflecting mirror 31 is inclined such that a reflection surface 31r faces the incidence portion 21 side toward an external side of the parallel light guiding body 22. In other words, the partially reflecting mirror 31 is inclined in a direction in which an upper end (+Z side) rotates counterclockwise with respect to a YZ plane orthogonal to the flat surfaces 22a and 22b by using a long side (Y direction) of the partially reflecting mirror 31 as an axis.

Hereinafter, an angle formed by the reflection surface 31r of the partially reflecting mirror 31 and the emission surface 32b of the light-transmittance member 32 is defined as an inclination angle δ of the partially reflecting mirror 31. In the present embodiment, the inclination angle δ of the partially reflecting mirror 31 is greater than or equal to 45° and smaller than 90°. In the present embodiment, the refractive index of the light-transmittance member 32 is equal to the refractive index of the parallel light guiding body 22, but the refractive indices thereof may be different from each other. In a case where the refractive index is different, it is necessary to change the inclination angle δ of the partially reflecting mirror 31 with respect to a case where the refractive indices are equal.

The partially reflecting mirror 31 includes a plurality of regions 31A and 31B with different reflectivity in the inclination direction. In the example of FIG. 4, a metal film is used as the reflective film, and the partially reflecting mirror 31 is formed of a metal film having a plurality of regions with mutually different film thicknesses in the inclination direction. The film thicknesses of the metal films in the respective regions 31A and 31B are, for example, 10 nm and 20 nm. In this example, the partially reflecting mirror 31 includes two regions 31A and 31B with different reflectivity, but the number of regions with different reflectivity is not limited to 2, and the number of regions may be 3 or more. In addition, the partially reflecting mirror 31 does not have regions with gradationally different reflectivity, and the reflectivity may be continuously different. In a case where the reflectivity is continuously different, the partially reflecting mirror 31 is included in the concept that the partially reflecting mirror includes a plurality of regions having different film thicknesses.

As described above, in a case where a metal film is used as the reflective film, it is possible to make the reflectivity differ by making the film thickness differ depending on the region. In addition, a material of the metal film may differ depending on the region. Furthermore, in a case where a dielectric multilayer film is used as the reflective film, it is possible to make the reflectivity differ by making the film thickness, the number of stacked layers, and the dielectric material of at least one layer of the dielectric multilayer film differ depending on the region.

In the partially reflecting mirror 31, the two regions with different reflectivity includes a high reflectivity region 31B which is positioned on a side close to the emission surface 32b in the inclination direction and have relatively high reflectivity, and a low reflectivity region 31A which is positioned on a side farther away from the emission surface 32b than the high reflectivity region 31B in the inclination direction and has reflectivity lower than that of the high reflectivity region 31B. That is, the high reflectivity region 31B corresponds to a region having a metal film with a thick film thickness, and the low reflectivity region 31A corresponds to a region having a metal film with a thin film thickness.

The plurality of partially reflecting mirrors 31 are provided such that an occupation area of the high reflectivity region 31B in each partially reflecting mirror 31 on a side far away from the incidence portion 21 is larger than an occupation area of the high reflectivity region 31B in each partially reflecting mirror 31 on a side close to the incidence portion 21.

Specifically, in a case of the present embodiment, the plurality of partially reflecting mirrors 31 is divided into two groups of a first partially reflecting mirror group 34A configured by a plurality of partially reflecting mirrors 31 on a side close to the incidence portion 21 and a second partially reflecting mirror group 34B configured by a plurality of partially reflecting mirrors 31 far away from the incidence portion 21. In the first partially reflecting mirror group 34A, the plurality of partially reflecting mirrors 31 have constant occupation areas of the high reflectivity regions 31B. In the second partially reflecting mirror group 34B, the plurality of partially reflecting mirrors 31 have constant occupation areas of the high reflectivity regions 31B.

That is, in the case of the present embodiment, the occupation areas of the high reflectivity regions 31B in the plurality of partially reflecting mirrors 31 gradationally increase from a side close to the incidence portion 21 toward a side far away from the incidence portion 21. In other words, in the side far away from the incidence portion 21, a boundary (reflectivity variation position) between the high reflectivity region 31B and the low reflectivity region 31A of one partially reflecting mirror 31 is set to a position far away from the emission surface 32b (observer) rather than the side close to the incidence portion 21. Accordingly, a boundary line (denoted by a dashed line) between the high reflectivity region 31B and the low reflectivity region 31A is curved in a stepwise shape over the plurality of partially reflecting mirrors 31. "The occupation area of the high reflectivity region 31B in the plurality of partially reflecting mirrors 31 gradationally increases" means that "a plurality of partially reflecting mirrors that are adjacent to each other and have the same reflectivity variation position exist".

Action of Optical Element

As illustrated in FIG. 3, FIG. 4, and the like, the plurality of partially reflecting mirrors 31 have an inclination angle $\delta$ of, for example, approximately 48° to 70°, specifically, for example, an inclination angle $\delta$ of 60°. Here, it is assumed that the elevation angle $\theta 0$ of the image light GL0 is set to, for example, 30°, the elevation angle $\phi 1$ of the image light GL 1 is set to, for example, 22°, and the elevation angle $\phi 2$ of the image light GL2 is set to, for example, 38°. In this case, the image light GL1 and the image light GL2 is incident on the eye EY of an observer with the angle $\gamma 1 = \gamma 2 \approx 12.5°$ with respect to the optical axis AX. The sum of the angle $\gamma 1$ and the angle $\gamma 2$ is referred to as an angle of view.

Thereby, in a case where components (image light GL1) having a relatively large total reflection angle in the image light GL is mainly incident on the portion 23h on the −x side of the optical element 30 and components having a relatively small total reflection angle (image light GL2) are mainly incident on portion 23m on the +x side of the emission portion 23, it is possible to efficiently emit the image light GL at an angle such that the image light GL is collected on the eye EY of an observer as a whole. Since the optical element 30 is configured to emit the image light GL with such an angular relationship, the light guiding device 20 can make the image light GL pass through only once without making the image element GL pass through the optical element 30 a plurality of times in principle. Accordingly, the optical element 30 can emit the image light GL as virtual image light with a small loss.

A small portion of the image light GL passes through (specifically, reflected once and passes through once or more times) the partially reflecting mirror 31 a plurality of times in the central side and a far side portions 23k and 23h, and the like of the optical element 30. In this case, the number of times of passing through the partially reflecting mirror 31 is plural, but since the reflected light from the plurality of partially reflecting mirrors 31 is respectively incident on the eye EY of observer as the image light GL, loss of the amount of light is not so large.

In addition, in the central side and the far side portions 23k and 23h and the like of the optical element 30, components of the image light GL reflected from the back side of the parallel light guiding body 22 or the observer side (that is, the light emission surface OS, the boundary surface IF, and the like) can also be generated. However, such image light GL is guided outside an optical path as non-use light GX (see FIG. 4) reflected by the partially reflecting mirror 31 and is prevented from being incident on the eye EY of the observer. The non-use light passing through the partially reflecting mirror 31 may be incident on the flat surface 22a on the external side again. However, in a case where the light is totally reflected here, most of the light can be incident on the portion 23h on the far side of the optical element 30, or can be incident on an effective region on the further far side, and thus, the possibility of being incident on the eye EY is reduced.

Effects of Present Embodiment

Hereinafter, specific effects of the optical element 30 according to the present embodiment will be described.

Figure 5:
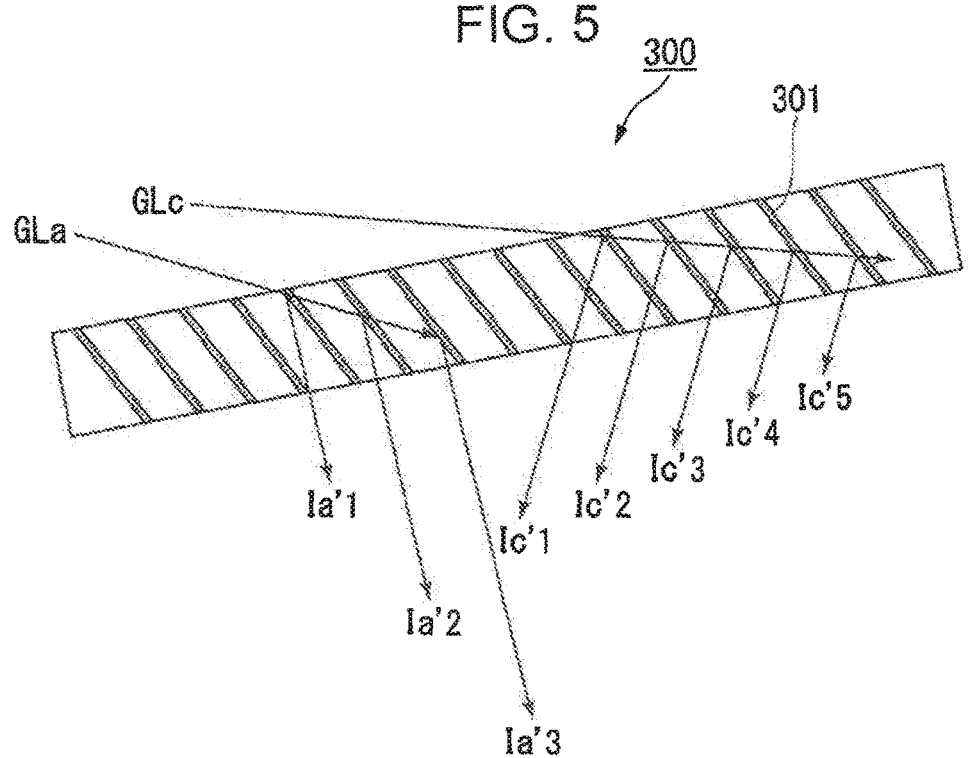
FIG. 5 is a sectional view of an optical element of related art.

FIG. 5 is a sectional view of an optical element 300 of related art.

As illustrated in FIG. 5, in an optical element 300 of related art, each of a plurality of partially reflecting mirrors 301 has constant in-plane reflectivity of one partially reflecting mirror 301. In this case, since image light GLa continuously transmits the plurality of partially reflecting mirrors 301, an intensity Ia'n decreases as the image light GLa progresses toward an observer side. That is, Ia'1>Ia'2>Ia'3. Due to the intensity decrease of the branched image light, a display state of the image does not become uniform. The same applies to image light GLc, and Ic'1>Ic'2>Ic'3>Ic'4>Ic'5.

Furthermore, image light GLa and image light GLc having different angles of view from each other are compared. A position at which the image light GLa is incident on the optical element 300 is close to an incidence portion of a light guiding body, and a position at which the image light GLc is incident on the optical element 300 is far away from the incidence portion of the light guiding body. Accordingly, the image light GLc is incident on the partially reflecting mirror 301 at an angle which is more perpendicular to the partially reflecting mirror 301 than the image light GLa, and is deflected while being branched by a larger number of partially reflecting mirrors 301. Accordingly, an intensity of the image light GLc is greatly lower than an intensity of the image light GLa. As a result, in the optical element 300 of related art, there is a problem that striped display unevenness is viewed.

In contrast to this, in the optical element 30 according to the present embodiment, since one partially reflecting mirror 31 has the high reflectivity region 31B on the observer side and has the low reflectivity region 31A on the external side, in a case where reflectivity of the high reflectivity region 31B is higher than reflectivity of the partially reflecting mirror 301 of related art, an intensity Ia"3 of the image light reflected by the high reflectivity region 31B is higher than an intensity Ia'3 of the image light reflected by the partially reflecting mirror 301 of related art. As such, it is possible to suppress a decrease in the intensity of image light branched by the partially reflecting mirror 31.

Furthermore, on the side far away from the incidence portion 21, a boundary (reflectivity variation position) between the high reflectivity region 31B and the low reflectivity region 31A in one partially reflecting mirror 31 is at a position separated from the observer. Accordingly, a degree of the intensity decrease (Ic'1>Ic'2>Ic"3) of the image light GLc proceeding to the side far away from the incidence portion 21 can approach a degree of the intensity decrease (Ia'1>Ia'2>Ia"3) of the image light GLa proceeding to the side close to the incidence portion 21. As a result, it is possible to suppress both variation of the intensity of the image light between the individual partially reflecting mirrors 31 and variation of the intensity of the image light on the side close to the incidence portion 21 and on the side far away from the incidence portion 21, and thereby, it is difficult to view the striped display unevenness.

Here, in order to demonstrate effects of the optical element 30 according to the present embodiment, an inventor performed the following optical simulation. As the optical simulation, an angular profile of an image at the center ($\phi$=0.5 mm) of an emission pupil was obtained for the following three kinds of optical elements. A diameter of a light receiver is 0.5 mm, which is smaller than a pitch (0.9 mm) of the partially reflecting mirror.

The optical element 30 in which reflectivity of the high reflectivity region 31B of the partially reflecting mirror 31 is 25%, reflectivity of the low reflectivity region 31A is 15%, and a ratio d/t of a difference d between a position t of the partially reflecting mirror 31 illustrated in FIG. 4 and a height of the reflectivity boundary in the two partially reflecting mirror groups 34A and 34B is 0.1 is assumed as the optical element of an example.

An optical element 30 in which the reflectivity of the high reflectivity region of the partially reflecting mirror is 25%, the reflectivity of the low reflectivity region is 15%, and the position of the reflectivity boundary is constant is assumed as an optical element of a comparative example.

An optical element in which reflectivity of the partially reflecting mirror is 20% and is uniform is assumed as the optical element of related art.

Figure 6:
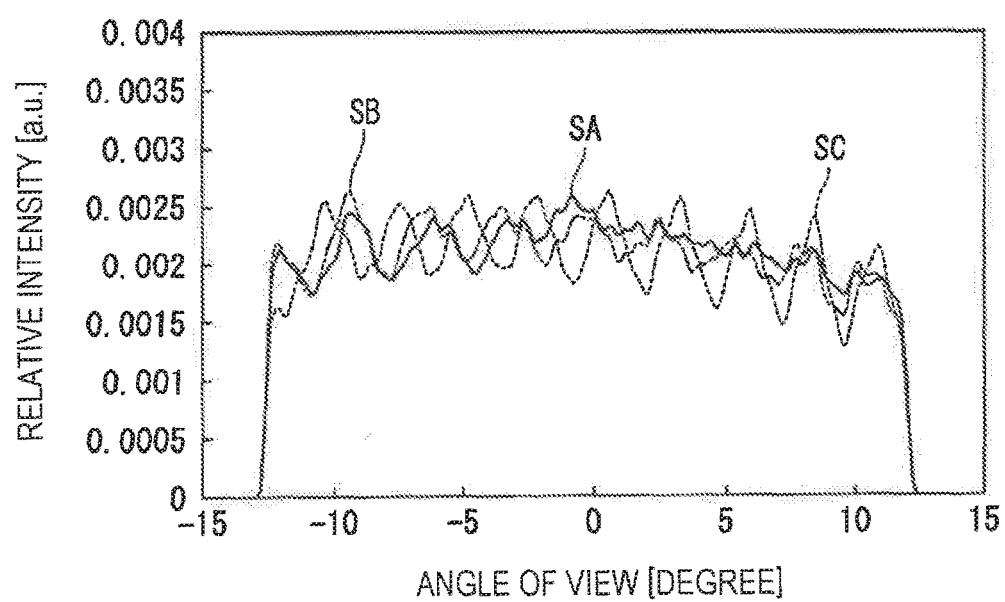
FIG. 6 is a graph illustrating a relationship between an angle of view and a relative intensity of emitted light.

FIG. 6 is a graph illustrating a relationship between an angle of view and a relative intensity of the emitted light. A horizontal axis of the graph is the angle of view (degree), and a vertical axis is a relative intensity [a.u.] of the emitted light. A negative angle of view is an angle of view on a side closer to an incidence portion than a central axis of the emission pupil and a positive angle of view is an angle of view on a side farther away from the incidence portion than the central axis of the emission pupil. The relative intensity is defined as the intensity of the emitted light for each angle of view when the intensity of the image light incident on the optical element is 1.

The graph denoted by a solid line SA indicates data of the optical element of an example, the graph denoted by a two-dotted chain line SB indicates data of the optical element according to a comparative example, and the graph denoted by a dashed line SC indicates data of the optical element of an example of related art.

When observing the optical element according to an example of related art, display unevenness is not viewed in a region (negative region of an angle of view) close to an incidence portion, and striped display unevenness is viewed in a region (positive region of the angle of view) far away from the incidence portion. From this, it is found that, if an intensity change of the emitted light is approximately 20% under this observation condition, a good image is observed, but if the intensity change of the emitted light is approximately 50%, the display unevenness is viewed, as denoted by a dashed line SC in FIG. 6.

In contrast to this, as in the optical element according to the comparative example, by providing regions having different reflectivity in the partially reflecting mirror, as denoted by a two-dotted chain line SB in FIG. 6, the intensity change of the emitted light decreases over the entire angle of view. Furthermore, as in the optical element of the example, by separating a boundary of the region (variation position of reflectivity) from the observer far away from the incidence portion, as denoted by a solid line SA in FIG. 6, the intensity change of the emitted light can be further decreased as compared with the optical element of the comparative example. When actually observing the optical element of the example, it is confirmed that the striped display unevenness is no longer viewed even in a region far away from the incidence portion.

Manufacturing Method of Optical Element

Hereinafter, three examples of a method of manufacturing the optical element according to the present embodiment will be described with reference to FIGS. 7A to 7D, 8A to 8D, and 9A to 9D.

First Manufacturing Method

Figure 7A:
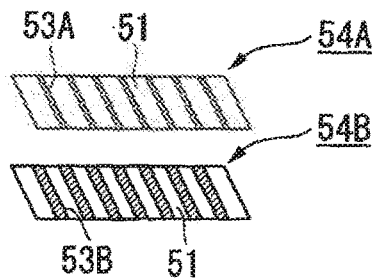
FIG. 7A is a process diagram illustrating a first manufacturing method of the optical element.

First, as illustrated in FIG. 7A, a first stacked body 54A which will be a low reflectivity region later is produced by stacking a plurality of transparent substrates 51 in which reflective films having a relatively thin thickness, for example, first reflective films 53A having a thickness of 10 nm are formed. In the same manner, a second stacked body 54B which will be a high reflectivity region later is produced by stacking a plurality of transparent substrates 51 in which reflective films having a relatively large thickness, for example, second reflective films 53B having a thickness of 20 nm are formed.

Figure 7B:
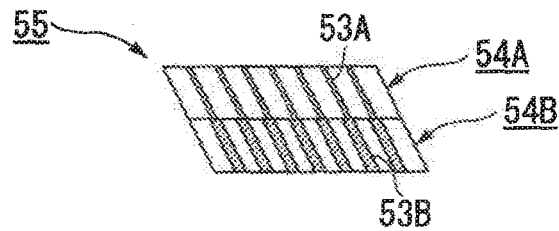
FIG. 7B is a continuation of the process diagram of FIG. 7A.

Next, as illustrated in FIG. 7B, the first stacked body 54A and the second stacked body 54B are overlapped with each other to produce a plurality of bonded bodies 55 such that each of the first reflective films 53A of the first stacked body 54A and each of the second reflective films 53B of the second stacked body 54B are connected to form one partially reflecting mirror.

Figure 7C:
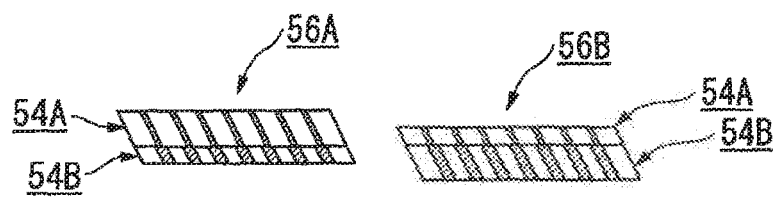
FIG. 7C is a continuation of the process diagram of FIG. 7B.

Next, as illustrated in FIG. 7C, a side where the second reflective film 53B having a large thickness is formed is removed more by polishing such that a large amount of the first reflective films 53A remain in a part of the plurality of bonded bodies 55, and thereby, the first bonded body 56A is produced. In contrast to this, a side where the first reflective film 53A having a thin thickness is formed is removed more by polishing such that a large amount of the second reflective films 53B remain in the other part of the plurality of bonded bodies 55, and thereby, the second bonded body 56B is produced.

Figure 7D:
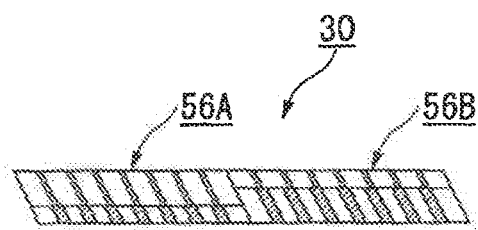
FIG. 7D is a continuation of the process diagram of FIG. 7C.

Next, as illustrated in FIG. 7D, the first bonded body 56A and the second bonded body 56B are bonded.

By the above processes, the optical element 30 according to the present embodiment is completed.

Second Manufacturing Method

Figure 8A:
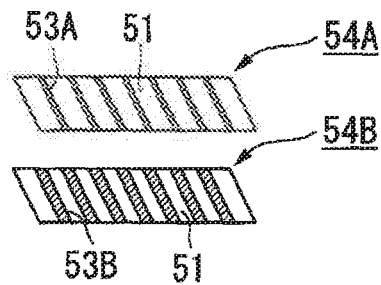
FIG. 8A is a process diagram illustrating a second manufacturing method of the optical element.

First, as illustrated in FIG. 8A, the first stacked body 54A which will be a low reflectivity region later is produced by stacking the plurality of transparent substrates 51 in which the first reflective films 53A having a relatively thin thickness are formed. In the same manner, the second stacked body 54B which will be a high reflectivity region later is produced by stacking the plurality of transparent substrates 51 in which the second reflective films 53B having a relatively large thickness are formed.

Figure 8B:
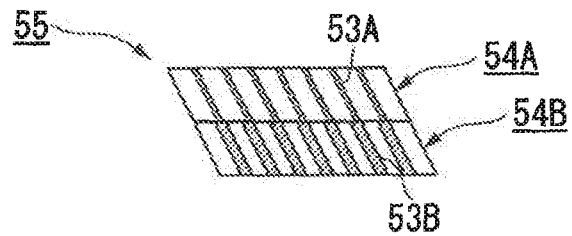
FIG. 8B is a continuation of the process diagram of FIG. 8A.

Next, as illustrated in FIG. 8B, the first stacked body 54A and the second stacked body 54B are overlapped with each other to produce the plurality of bonded bodies 55, such that each of the first reflective films 53A of the first stacked body 54A and each of the second reflective films 53B of the second stacked body 54B are connected to form one partially reflecting mirror.

Figure 8C:
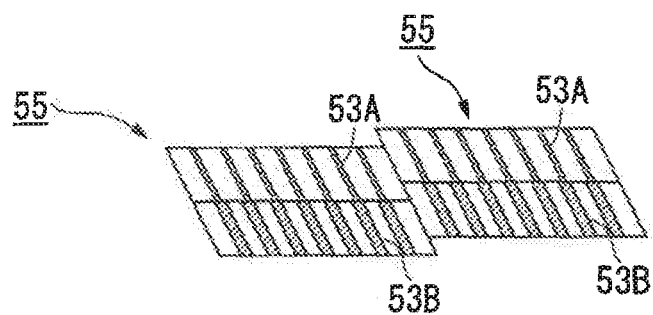
FIG. 8C is a continuation of the process diagram of FIG. 8B.

Next, as illustrated in FIG. 8C, a bonded position between the first reflective film 53A and the second reflective film 53B in one bonded body 55 and another bonded position between the first reflective film 53A and the second reflective film 53B in another bonded body 55 are disposed so as to be shifted from each other, and the two bonded bodies 55 are bonded together.

Figure 8D:
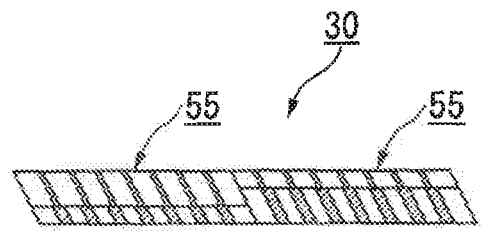
FIG. 8D is a continuation of the process diagram of FIG. 8C.

Next, as illustrated in FIG. 8D, a part of the two bonded bodies 55 is removed by polishing until the mutually shifted surfaces of the two bonded bodies 55 become flat surfaces, and thereby, the optical element 30 is produced.

By the above processes, the optical element 30 according to the present embodiment is completed.

Third Manufacturing Method

Figure 9A:
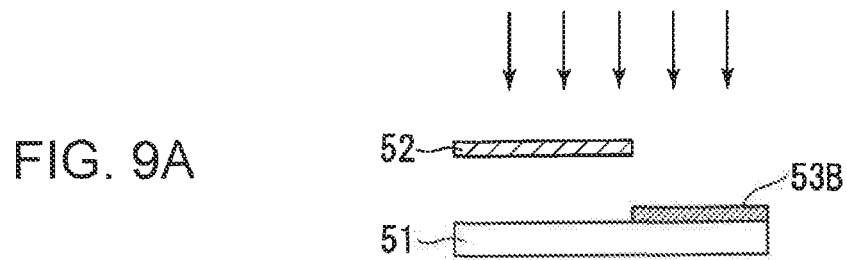
FIG. 9A is a process diagram illustrating a third manufacturing method of the optical element.

First, as illustrated in FIG. 9A, as a first film formation process, a metal film such as aluminum is formed with a thickness of, for example, 20 nm on one surface of a transparent substrate 51 by using a vapor deposition method which uses a mask 52 or a sputtering method, and the second reflective film 53B is formed.

Figure 9B:
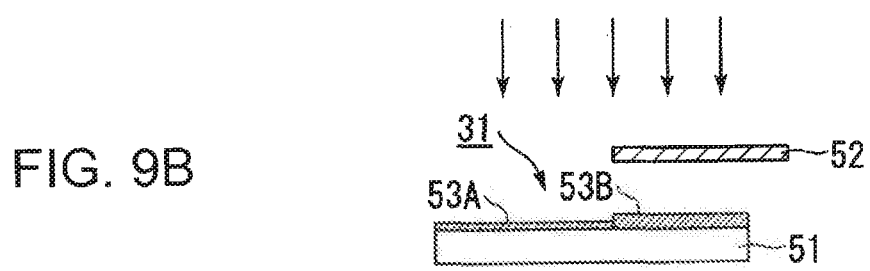
FIG. 9B is a continuation of the process diagram of FIG. 9A.

Next, as illustrated in FIG. 9B, as a second film formation process, the mask 52 is moved above a region where the second reflective film 53B is formed in the first film formation process, a metal film of the same material is formed with a film thickness of, for example, 20 nm on one surface of the transparent substrate 51, and the first reflective film 53A is formed. By doing so, the transparent substrate 51 including the partially reflecting mirror 31 having the low reflectivity region and the high reflectivity region is produced.

Figure 9C:
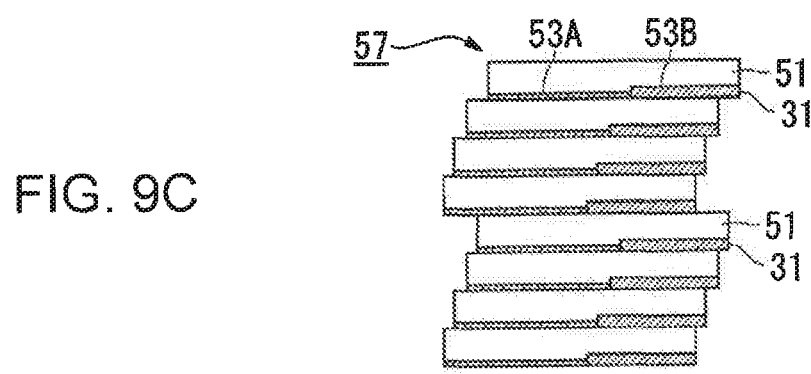
FIG. 9C is a continuation of the process diagram of FIG. 9B.

Next, as illustrated in FIG. 9C, a stacked body 57 is produced by stacking the plurality of transparent substrates 51 including the partially reflecting mirror 31. At this time, the plurality of transparent substrates 51 are stacked and bonded in a state where being positioned, such that a boundary position between the first reflective film 53A and the second reflective film 53 B is gradationally shifted.

Figure 9D:
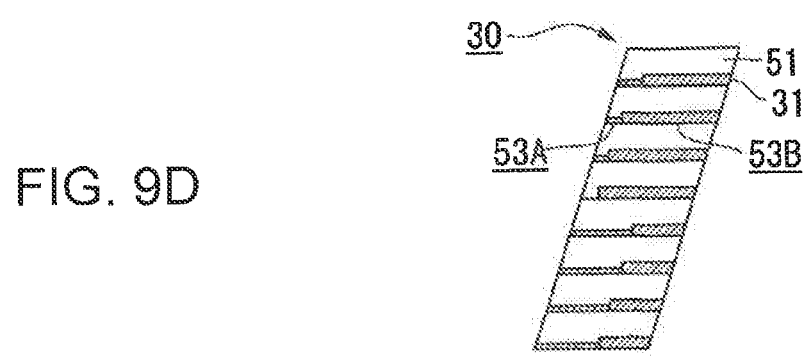
FIG. 9D is a continuation of the process diagram of FIG. 9C.

Next, as illustrated in FIG. 9D, a part of the plurality of transparent substrates 51 is removed by polishing until a plurality of shifted surfaces of the plurality of transparent substrates 51 become planarized surfaces over the entire surfaces, and thereby the optical element 30 is produced.

By the above processes, the optical element 30 according to the present embodiment is completed.

As such, the optical element 30 according to the present embodiment in which an intensity distribution of emitted light is uniform can be produced by a simple manufacturing method.

Second Embodiment

Hereinafter, a second embodiment will be described with reference to FIGS. 10 to 14C.

A basic configuration of a display device according to the second embodiment is the same as that of the first embodiment, and a configuration of an optical element is different from that of the first embodiment. Accordingly, description of the entire display device will be omitted, and only the optical element will be described.

Figure 10:
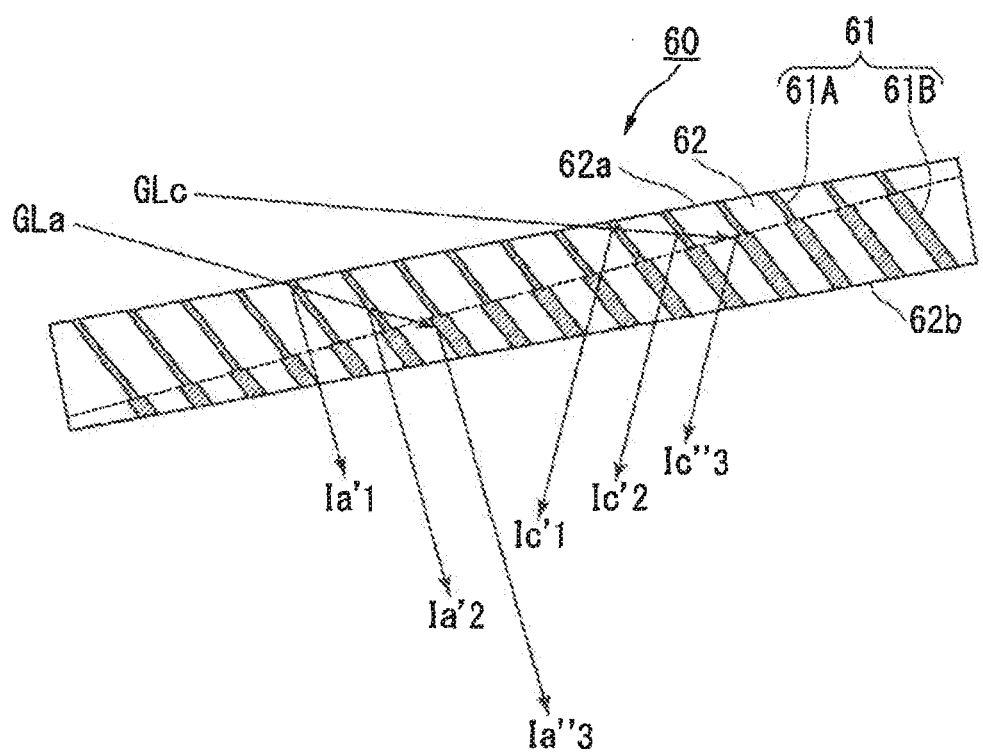
FIG. 10 is a sectional view of an optical element according to a second embodiment.

FIG. 10 is a sectional view of the optical element according to the second embodiment. FIG. 10 corresponds to FIG. 4 in the first embodiment.

In FIG. 10, the same components as those in FIG. 4 are denoted by the same reference numerals or symbols, and description thereof will be omitted.

Configuration of Optical Element

As illustrated in FIG. 10, an optical element 60 according to the second embodiment includes a plurality of partially reflecting mirrors 61 and a plurality of light-transmittance members 62. In the optical element 60 according to the second embodiment, the partially reflecting mirror 61 includes a high reflectivity region 61B positioned on a side close to an emission surface 62b in an inclination direction, and a low reflectivity region 61A positioned on a side far away from the emission surface 62b in the inclination direction. In addition, the plurality of partially reflecting mirrors 61 are provided such that occupation areas of the high reflectivity regions 61B in the partially reflecting mirror 61 on a side far away from the incidence portion 21 are larger than occupation areas of the high reflectivity regions 61B in the partially reflecting mirror 61 on a side close to the incidence portion 21.

In a case of the present embodiment, in the plurality of partially reflecting mirrors 61, the occupation areas of the high reflectivity regions 61B sequentially increase at a constant rate from the side close to the incidence portion 21 toward the side far away from the incidence portion 21. That is, in the first embodiment, the occupation areas of the high reflectivity regions 31B in the plurality of partially reflecting mirrors 31 are gradationally increase from the side close to the incidence portion 21 toward the side far away from the incidence portion 21. In contrast to this, in the present embodiment, the occupation areas of the high reflectivity regions 61B in the plurality of partially reflecting mirrors 61 linearly increase from the side close to the incidence portion 21 toward the side far away from the incidence portion 21. "The occupation areas of the high reflectivity regions 61B in the plurality of partially reflecting mirrors 61 linearly increase" means that "a plurality of partially reflecting mirrors that are adjacent to each other and have the same reflectivity variation position do not exist, and the reflectance variation positions of the partially reflecting mirrors adjacent to each other are different from each other".

The rest of the configuration is the same as in the first embodiment.

In the present embodiment, it is also possible to suppress variation of an intensity of image light on the side close to the incidence portion 21 and on the side far away from the incidence portion 21 in the optical element 60, and to make it difficult to view striped display unevenness, which are the same effects as the first embodiment.

In the present embodiment, the present inventor also performed optical simulation for demonstrating effects. As the optical simulation, an angular profile of an image at the center ($\phi$=0.5 mm) of an emission pupil was obtained for the following three kinds of optical elements. A diameter of a light receiver is 0.5 mm, which is smaller than a pitch (0.9 mm) of the partially reflecting mirror.

Ab optical element in which reflectivity of the high reflectivity region of the partially reflecting mirror is 25%, reflectivity of the low reflectivity region is 15%, and an inclination angle $\alpha$ between a straight line connecting a boundary (reflectivity variation position) between the high reflectivity region and the low reflectivity region of each partially reflecting mirror illustrated in FIG. 10 and the emission surface is 2.5 degrees is assumed as the optical element of the example.

An optical element in which the reflectivity of the high reflectivity region of the partially reflecting mirror is 25%, the reflectivity of the low reflectivity region is 15%, and a position of a reflectivity boundary is constant is assumed as an optical element of a comparative example.

An optical element in which reflectivity of the partially reflecting mirror is 20% and is uniform is assumed as the optical element of related art.

Figure 11:
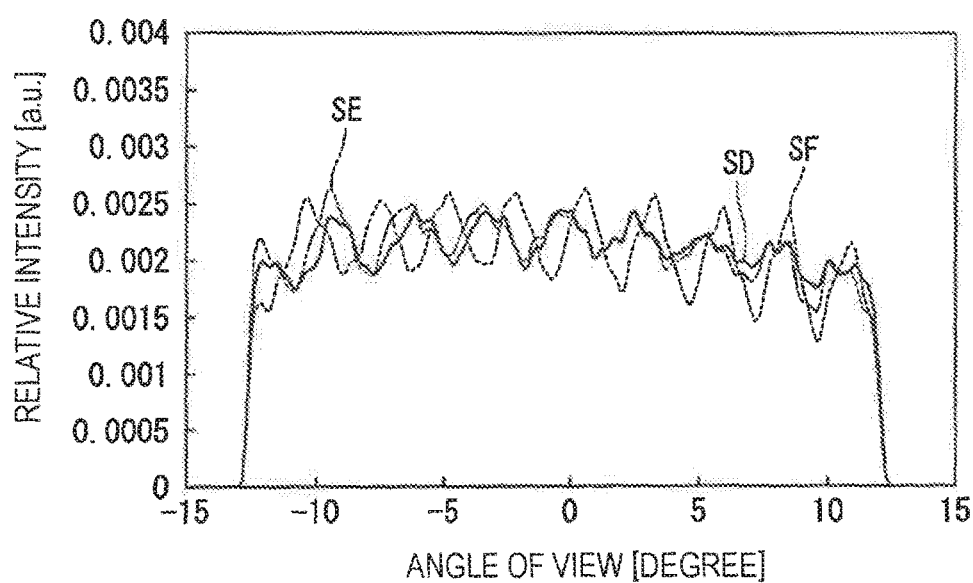
FIG. 11 is a graph illustrating a relationship between an angle of view and a relative intensity of emitted light.

FIG. 11 is a graph illustrating a relationship between an angle of view and a relative intensity of emitted light. A horizontal axis of the graph is the angle of view [degree], and a vertical axis is a relative intensity [a.u.] of the emitted light. A negative angle of view is an angle on a side closer to an incidence portion than a central axis of an emission pupil, and a positive angle of view is an angle of view on a side farther away from the incidence portion than the central axis of the emission pupil.

The graph denoted by a solid line SD indicates data of the optical element according to an example, the graph denoted by a two-dotted chain line SE indicates data of the optical element according to a comparative example, and the graph denoted by a dashed line SF indicates data of the optical element of an example of related art.

As illustrated in FIG. 11, in the optical element of related art denoted by the dashed line SF, variation of the relative intensity of the emitted light is particularly large in a region far away from the incidence portion. When actually observing the optical element of the example of related art, display unevenness is not viewed in a region close to the incidence portion (region where an angle of view is negative), and stripped display unevenness is viewed in the region far away from the incidence portion (region where the angle of view is positive).

In contrast to this, as in the optical element of the comparative example denoted by the two-dotted chain line SE, a change in the intensity of the emitted light decreases over the entire angle of view by providing regions with different reflectivity in the partially reflecting mirror. Furthermore, as in the optical element of the example denoted by the solid line SD, the intensity change of the emitted light can be further decreased by setting a boundary (variation position of reflectivity) of a region far away from the observer as the boundary further does far away from the incidence portion, compared with the optical element of the comparative example. When the optical element of the example is actually observed, the striped display unevenness is not viewed even in a region far away from the incidence portion.

Manufacturing Method of Optical Element

Hereinafter, three examples of a manufacturing method of the optical element according to the present embodiment will be described with reference to FIGS. 12A to 12C, 13A to 13C, and 14A to 14E.

First Manufacturing Method

Figure 12A:
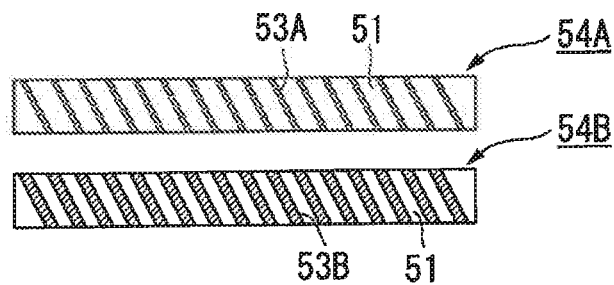
FIG. 12A is a process diagram illustrating a first manufacturing method of the optical element.

First, as illustrated in FIG. 12A, the first stacked body 54A which will be a low reflectivity region later is produced by stacking the plurality of transparent substrates 51 in which reflective films having a relatively thin thickness, for example, the first reflective films 53A having a thickness of 10 nm are formed. In the same manner, the second stacked body 54B which will be a high reflectivity region later is produced by stacking the plurality of transparent substrates 51 in which reflective films having a relatively large thickness, for example, second reflective films 53B having a thickness of 20 nm are formed.

Figure 12B:
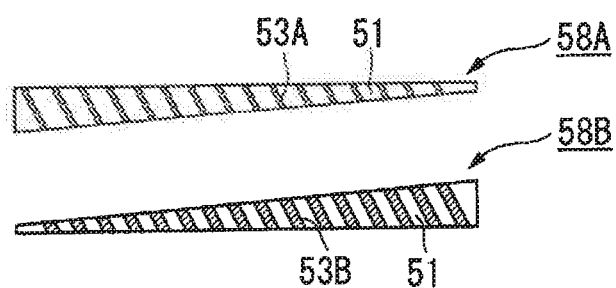
FIG. 12B is a continuation of the process diagram of FIG. 12A.

Next, as illustrated in FIG. 12B, each of the first stacked body 54A and the second stacked body 54B are polished obliquely such that two opposing surfaces are not parallel.

Figure 12C:
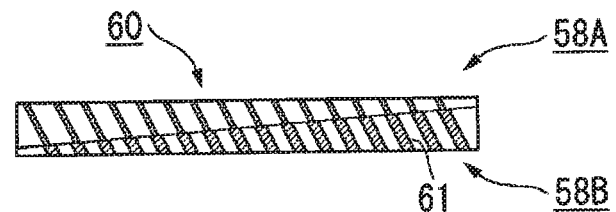
FIG. 12C is a continuation of the process diagram of FIG. 12B.

Next, as illustrated in FIG. 12C, the first stacked body 54A and the second stacked body 54B are overlapped and bonded together in such a manner that the inclination surfaces face each other, and thereby, the optical element 60 is produced.

By the above processes, the optical element according to the embodiment is completed.

Second Manufacturing Method

Figure 13A:
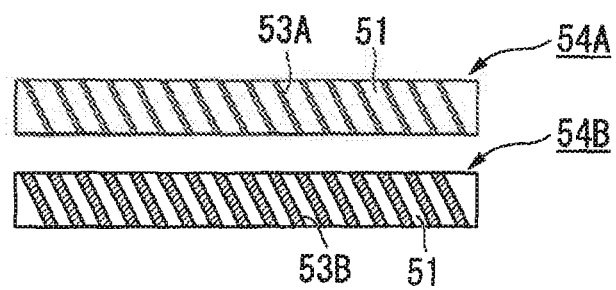
FIG. 13A is a process diagram illustrating a second manufacturing method of the optical element.

First, as illustrated in FIG. 13A, the first stacked body 54A which will be a low reflectivity region later is produced by stacking the plurality of transparent substrates 51 in which the first reflective films 53A having a relatively thin thickness are formed. In the same manner, the second stacked body 54B which will be a high reflectivity region later is produced by stacking the plurality of transparent substrates 51 in which the second reflective films 53B having a relatively large thickness are formed.

Figure 13B:
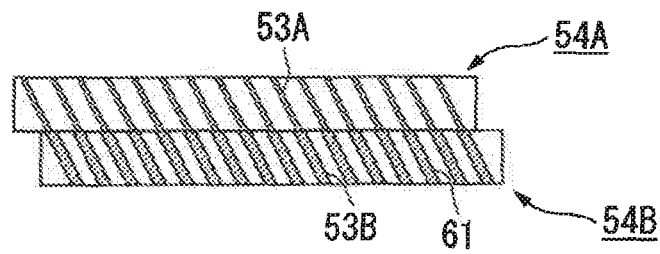
FIG. 13B is a continuation of the process diagram of FIG. 13A.

Next, as illustrated in FIG. 13B, the first stacked body 54A and the second stacked body 54B are overlapped and bonded to each other such that each of the first reflective films 53A of the first stacked body 54A and each of the second reflective films 53B of the second stacked body 54B are connected to become one partially reflecting mirror 61, and thereby, a bonded body is produced.

Figure 13C:
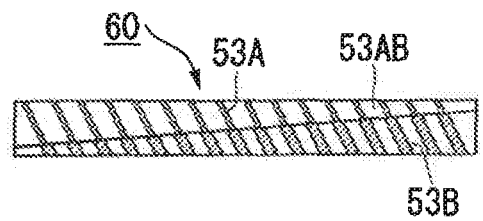
FIG. 13C is a continuation of the process diagram of FIG. 13B.

Next, as illustrated in FIG. 13C, two surfaces facing each other are polished such that a boundary surface 53AB between the first reflective film 53A and the second reflective film 53B is not parallel with respect to the polished surface, and thereby, the optical element 60 is produced.

By the above processes, the optical element 60 according to the present embodiment is completed.

Third Manufacturing Method

Figure 14A:
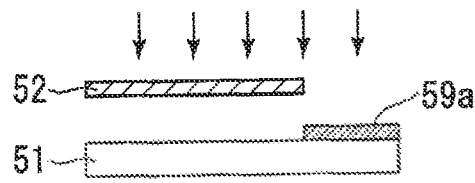
FIG. 14A is a process diagram illustrating a third manufacturing method of the optical element.

First, as illustrated in FIG. 14A, a metal film 59a such as aluminum is formed on one surface of the transparent substrate 51 by using a vapor deposition method which uses the mask 52 or a sputtering method, as a first film formation process.

Figure 14B:
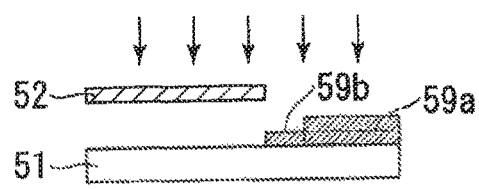
FIG. 14B is a continuation of the process diagram of FIG. 14A.

Next, as illustrated in FIG. 14B, the mask 52 is moved in a direction separated from a region where the metal film 59a is formed in the first film formation process, and thereafter, a metal film 59b of the same material is formed with a predetermined thickness on one surface of the transparent substrate 51, as a second film formation step. At this time, since the metal film 59b of the second film formation process is also formed on the metal film 59a formed in the first film formation process, the metal film in the metal film formation region in the first film formation process is thicker than the metal film in the metal film formation region in the second film formation process.

Figure 14C:
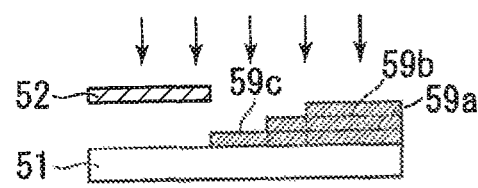
FIG. 14C is a continuation of the process diagram of FIG. 143.

In the same manner, as illustrated in FIG. 14C, the mask 52 is moved in a direction separated from a region where a new metal film 59b is formed in the second film formation process, and thereafter, a metal film 59c of the same material is formed with a predetermined thickness on one surface of the transparent substrate 51, as the third film formation process. Thereby, a partially reflecting mirror whose upper surface has a step difference is formed.

The number of times of the film formation processes is not limited to three, and may be more. By increasing the number of times of the film formation processes and reducing the steps of the film thickness, a partially reflecting mirror having a fine step difference can be formed. In addition, instead of a method of performing film formation after a mask is moved, film formation may be performed while moving the mask. According to the method, it is possible to form a partially reflecting mirror having an inclined surface without step difference.

Figure 14D:
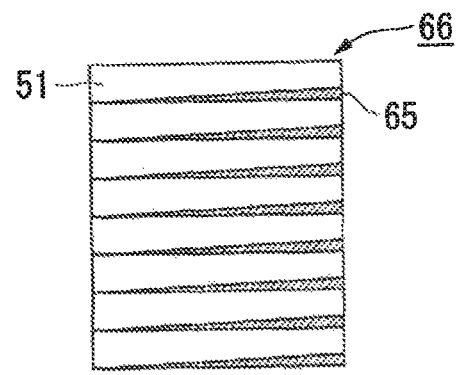
FIG. 14D is a continuation of the process diagram of FIG. 14C.

Next, as illustrated in FIG. 14D, the plurality of transparent substrates 51 including partially reflecting mirrors 65 are stacked and bonded, and thereby, a stacked body 66 is produced. Here, the partially reflecting mirrors 65 having an inclined surface without step difference is illustrated.

Figure 14E:
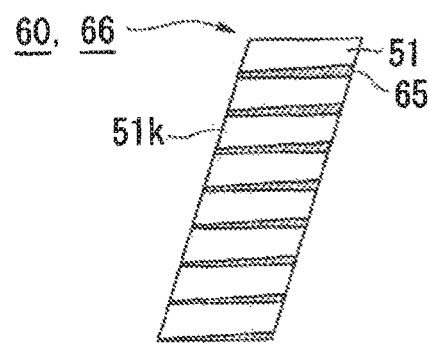
FIG. 14E is a continuation of the process diagram of FIG. 14D.

Next, as illustrated in FIG. 14E, the stacked body 66 is obliquely polished such that portions having different thicknesses of the plurality of partially reflecting mirrors 65 are exposed on a polished surface $51k$ in a thickness direction of the stacked body 66, and thereby, the optical element 60 is produced.

By the above processes, the optical element 60 according to the present embodiment is completed.

Effects of Plurality of Reflectivity Regions Provided

As in the optical elements according to the first and second embodiments, the partially reflecting mirror has a plurality of regions having different reflectivity, and thereby, effects of brightening display are also obtained.

Figure 15:
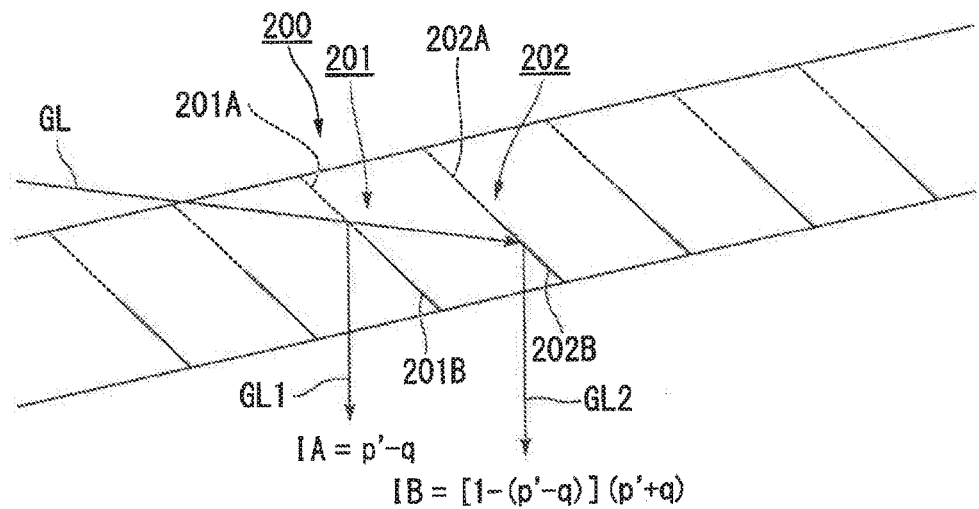
FIG. 15 is a view illustrating an operation of the optical element of the embodiment.

FIG. 15 is a view illustrating an operation of an optical element 200 according to the embodiment.

For the sake of simple description, a sum S of the relative intensity $I_A$ of the image light GL1 which is reflected once by a partially reflecting mirror 201 and reaches an observer and the relative intensity $I_B$ of the image light GL2 which reaches the observer after transmitting the partially reflecting mirror 201 and reflected once by a next partially reflecting mirror 202, is considered.

In a case where reflectivity of the partially reflecting mirror is uniform in a surface as in the optical element of related art, and if the reflectivity is p, the sum S of the relative intensities is represented by the following Equation (2).

$$S = p + p(1-p) = 2p - p^2 \qquad (2)$$

Meanwhile, in a case where the partially reflecting mirrors 201 and 202 have two regions (high reflectivity regions 201B and 202B and low reflectivity regions 201A and 202A) having different reflectivity as illustrated in FIG. 15, if average reflectivity of the two regions is referred to as p', the reflectivity of the high reflectivity region on an observer side is referred to as (p'+q), the reflectivity of the low reflectivity region on a back side of the reflectivity is referred to as (p'−q), and the image light passes through the low reflectivity region of the partially reflecting mirror and thereafter is reflected by the high reflectivity region of the next partially reflecting mirror, the sum S of the relative intensities is represented by the following Equation (3).

$$S' = (p'-q) + [1-(p'-q)](p'+q) = 2p' - p'^2 + q^2 \qquad (3)$$

From the Equations (2) and (3), it turns out that the relative intensity of the image light increases by $q^2$ and display is brightened by providing two regions (a high reflectivity region and a low reflectivity region) having different reflectivity in the partially reflecting mirror.

Furthermore, since the partially reflecting mirror has a plurality of regions having different reflectivity, an effect of reducing a ghost of an external image (see-through image) is also obtained.

Figure 16:
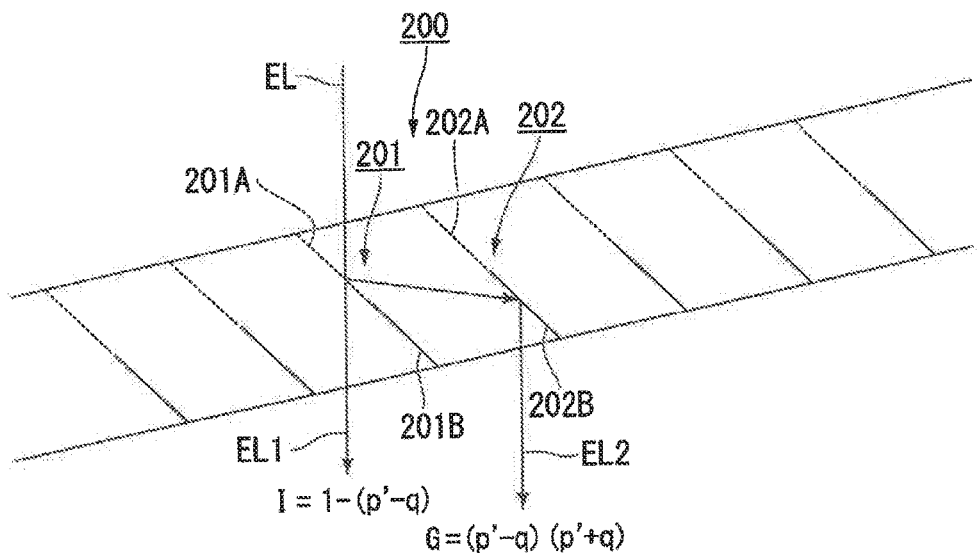
FIG. 16 is a view illustrating another operation of the optical element of the embodiment.

FIG. 16 is a view illustrating another operation of the optical element according to the embodiment.

As illustrated in FIG. 16, the ghost of the external image is caused by the fact that there are external light EL1 which passes through the partially reflecting mirror 201 once and reaches an observer and external light EL2 which reaches the observer after being reflected once by the partially reflecting mirror 201 and reflected by the next partially reflecting mirror 202. In a case where reflectivity of the partially reflecting mirror is uniform in a surface as in the optical element of related art, if the reflectivity is referred to as p, a relative intensity G of light causing the ghost is represented by the following Equation (4).

$$G = p^2 \qquad (4)$$

Meanwhile, in a case where the partially reflecting mirrors 201 and 202 include two regions (the high reflectivity regions 201B and 202B and low reflectivity regions 201A and 202A) having different reflectivity, if average reflectivity of the two regions is p' and the reflectivity of the high reflectivity region on an observer side is (p'+q) and the reflectivity of the low reflectivity region on the back side of the observer is (p'−q), a relative intensity G' of the external light EL2 which causes the ghost is represented by the following Equation (5).

$$G' = (p'-q)(p'+q) = p'^2 - q^2 \qquad (5)$$

From the equations (4) and (5), it turns out that the relative intensity of light causing a ghost is reduced by $q^2$ and the ghost is hard to see by providing the two regions (the high reflectivity region and the low reflectivity region) having different reflectivity in the partially reflecting mirror.

Incidentally, a reflectivity difference between the high reflectivity region and the low reflectivity region is not always good merely because the reflectivity difference is large. If the reflectivity difference is too large, it is considered that display unevenness may be rather increased.

Figure 17:
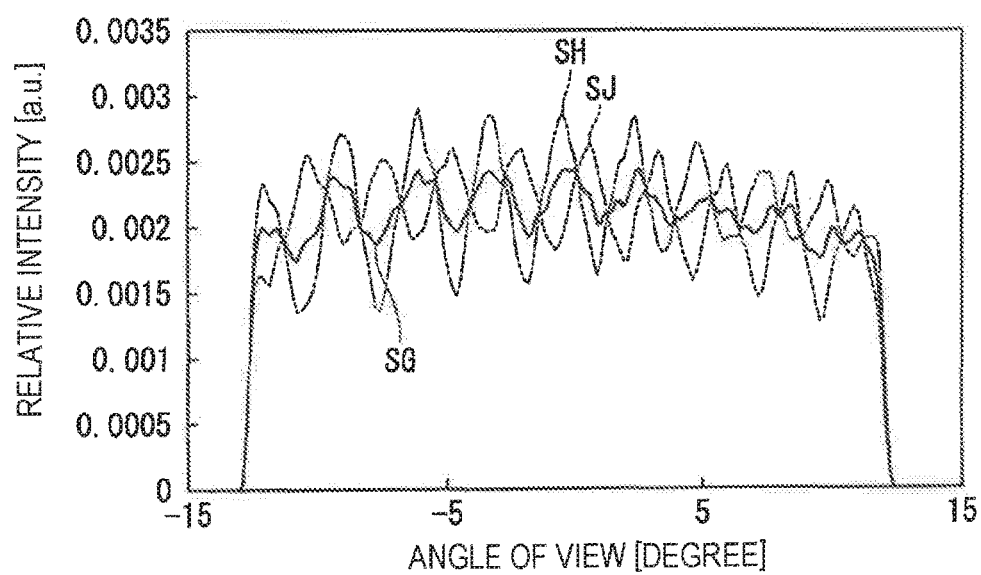
FIG. 17 is a graph illustrating a relationship between an angle of view and a relative intensity of emitted light.

FIG. 17 is a graph illustrating a relationship between an angle of view and the relative intensity of emitted light when the reflectivity difference between the high reflectivity region and the low reflectivity region is changed with the average reflectivity set to 20%.

A horizontal axis of the graph is an angle of view [degree], and a vertical axis is a relative intensity [a.u.] of emitted light. A negative angle of view is an angle of view close to the incidence portion with respect to a central axis of the emission pupil and a positive angle of view is an angle of view on a side far away from the incidence portion with respect to the central axis of the emission pupil.

The graph denoted by a solid line SG indicates data when the reflectivity of the high reflectivity region is 25%, the reflectivity of the low reflectivity region is 15%, and the reflectivity difference is 10%.

The graph denoted by two-dotted chain line SH indicates data when the reflectivity of the high reflectivity region is 29%, the reflectivity of the low reflectivity region is 11%, and the reflectivity difference is 18%.

The graph indicated by a dashed line SJ indicates data when the reflectivity is constant in a surface of the partially reflecting mirror.

As illustrated in FIG. 17, in the optical element of the embodiment including two regions having different reflectivity in the surface of the partially reflecting mirror, it is found that increase and decrease of the relative intensity of the emitted light are reduced and striped display unevenness is reduced as compared with the optical element of related art having constant reflectivity in the surface of the partially reflecting mirror. In addition, it is also found that, if the reflectivity difference between the high reflectivity region and the low reflectivity region is changed, an amplitude of the relative intensity changes in accordance with the change of the reflectivity difference.

Incidentally, the present inventor changed the reflectivity difference to various values and obtained the amplitude of the relative intensity corresponding to each reflectivity difference. At this time, the amplitude was obtained from data of an intensity profile illustrated in FIG. 17 by using a sinusoidal fitting method. The results are illustrated in FIG. 18.

Figure 18:
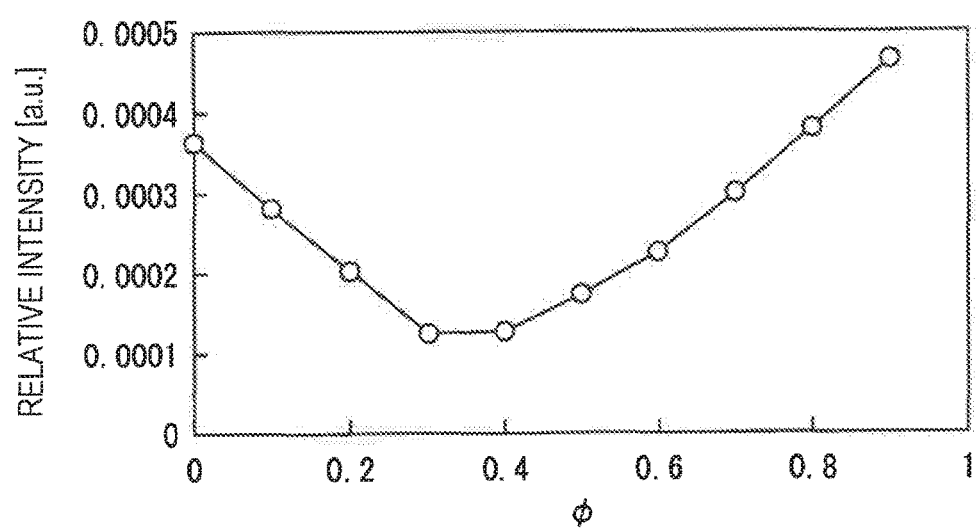
FIG. 18 is a graph illustrating a relationship between a reflectivity difference parameter and an amplitude of an intensity of the emitted light.

FIG. 18 is a graph illustrating a relationship between the reflectivity difference parameter Φ and the amplitude of the intensity of the emitted light. A horizontal axis of the graph is a reflectivity difference parameter Φ [−], and a vertical axis is an amplitude [a.u.]. When the reflectivity of the high reflectivity region is referred to as $R_1$ and the reflectivity of the low reflectivity region is referred to as $R_2$, the reflectivity difference parameter $\Phi$ is defined by the following Equation (6).

$$\Phi=(R_1-R_2)/[(R_1+R_2)/2] \qquad (6)$$

In a case of the optical element of related art having constant reflectivity in the surface of the partially reflecting mirror, the reflectivity difference parameter $\Phi$ is $\Phi=0$. Accordingly, in the optical element according to the present embodiment, the reflectivity of the high reflectivity region and the reflectivity of the low reflectivity region have to be set respectively such that the amplitude of the relative intensity of the emitted light is smaller than the amplitude (approximately 0.00035) when $\Phi=0$. In the present examination example, it is necessary to set each reflectivity such that the reflectivity difference parameter $\Phi$ satisfies $\Phi<0.75$, from FIG. 18.

According to experience of an inventor, it is found that display unevenness may be viewed depending on individual differences or a condition such as brightness of image in the optical element ($\Phi=0$) having constant reflectivity of the partially reflecting mirror. Accordingly, it is preferable that the high reflectivity region and the low reflectivity region be set such that the reflectivity difference parameter $\Phi$ satisfies $0.1<\Phi<0.7$ in a range in which the amplitude of the relative intensity of the emitted light is smaller than the amplitude when $\Phi=0$.

Third Embodiment

Hereinafter, a third embodiment will be described with reference to FIGS. 19 to 21.

A basic configuration of a display device according to the third embodiment is the same as the configuration according to the first embodiment, and a configuration of the optical element is different from the configuration according to the first embodiment. Accordingly, description of the entire display device is omitted, and only the optical element will be described.

Figure 19:
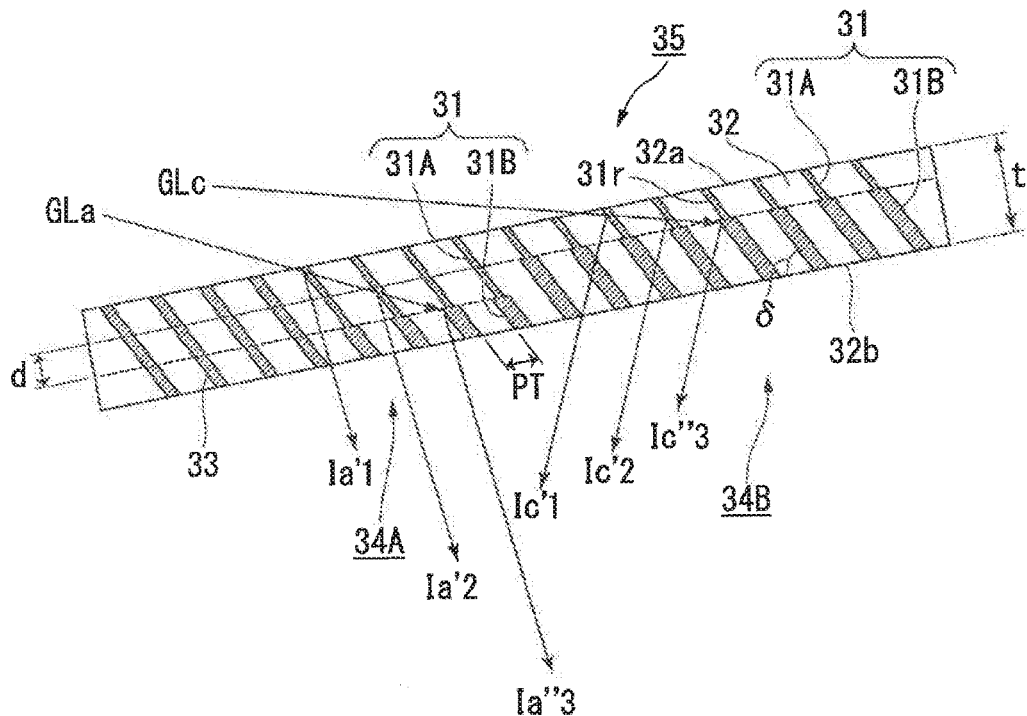
FIG. 19 is a sectional view of an optical element according to a third embodiment.

FIG. 19 is a sectional view of the optical element according to the third embodiment. FIG. 20 is a graph illustrating a relationship between an angle of view and a relative intensity of emitted light. FIG. 21 is a sectional view of the optical element according to a modification example of the third embodiment.

Figure 21:
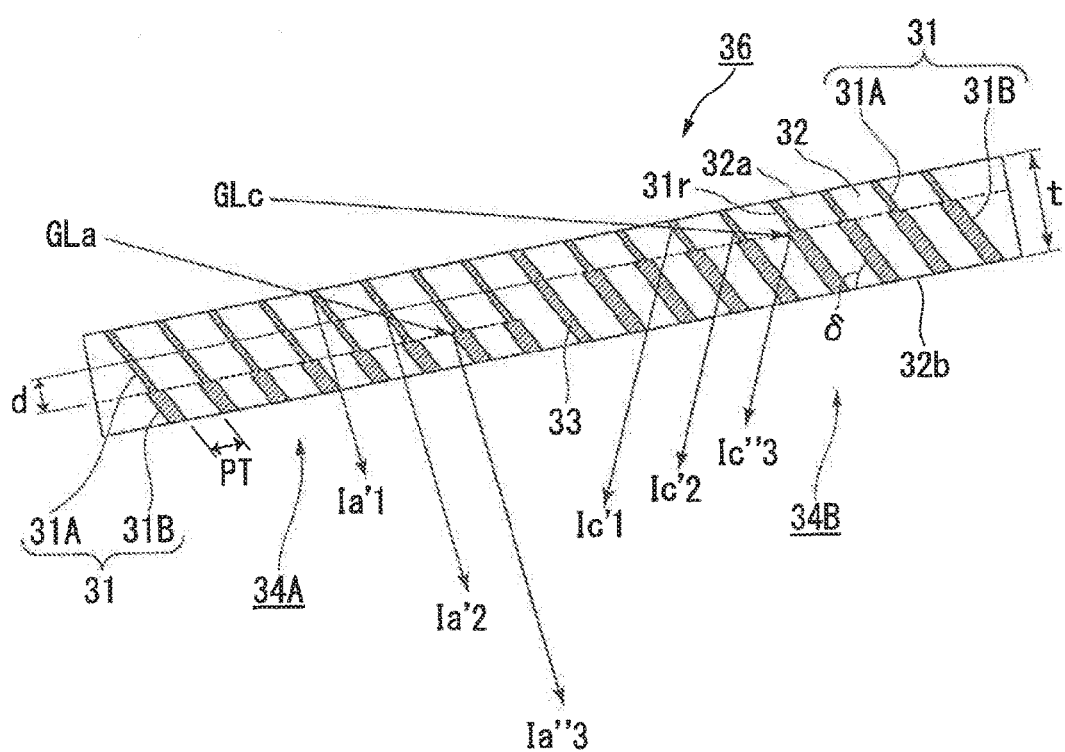
FIG. 21 is a sectional view of the optical element according to a modification example of the third embodiment.

FIGS. 19 and 21 correspond to FIG. 4 of the first embodiment. In FIGS. 19 and 21, the same reference numerals or symbols are attached to the same configuration elements as those in FIG. 4, and description thereof is omitted.

As illustrated in FIG. 19, an optical element 35 according to the present embodiment includes a plurality of reflectivity variation partially reflecting mirrors 31, a plurality of reflectivity constant partially reflecting mirrors 33, and the plurality of light transmittance members 62. Each of the plurality of reflectivity constant partially reflecting mirrors 33 is provided in parallel with each of the plurality of reflectivity variation partially reflecting mirrors 31, and is disposed on a side close to the incidence portions 21 (see FIG. 1) of the plurality of reflectivity variation partially reflecting mirrors 31. That is, the optical element 35 according to the present embodiment further includes the reflectivity constant partially reflecting mirrors 33 provided in parallel with each of the plurality of reflectivity variation partially reflecting mirrors 31.

In FIG. 19, four reflectivity constant partially reflecting mirrors 33 are provided on a side close to the incidence portions 21 of the plurality of reflectivity variation partially reflecting mirrors 31, but the number of reflectivity constant partially reflecting mirrors 33 is not limited in particular, and may be plural or one. In addition, the reflectivity constant partially reflecting mirrors 33 may be provided on a side far away from the incidence portions 21 of the plurality of reflectivity variation partially reflecting mirrors 31, and may be provided on a side close to the incidence portions 21 of the plurality of reflectivity variation partially reflecting mirrors 31, or at least one of the sides far away from the incidence portions 21.

In addition, in the plurality of reflectivity variation partially reflecting mirrors 31, an occupation area of the high reflectivity regions 31B in the plurality of reflectivity variation partially reflecting mirrors 31 is gradationally increases from the side close to the incidence portion 21 toward the side far away from the incidence portion 21, in the same manner as in the first embodiment. Instead of this configuration, an occupation area of the high reflectivity regions 31B in the plurality of reflectivity variation partially reflecting mirrors 31 may linearly increase from the side close to the incidence portion 21 toward the side far away from the incidence portion 21, in the same manner as in the second embodiment.

In the present embodiment, the same effects as the first embodiment are also obtained that it is possible to suppress variation of intensity of an image light on sides close to and far away from the incidence portion 21 of the optical element 35 so as to be small and it difficult to view the striped display unevenness.

In addition, according to the configuration of the present embodiment, by using not only the reflectivity variation partially reflecting mirrors 31 but also the reflectivity constant partially reflecting mirrors 33, manufacturing cost of the optical element 35 can be reduced. Particularly, by appropriately setting arrangement and the number of reflectivity constant partially reflecting mirrors 33, it is possible to sufficiently suppress deterioration of characteristic of the optical element 35 and to reduce manufacturing cost of the optical element 35.

In the present embodiment, the present inventor also performed an optical simulation to demonstrate effects. For the optical simulation, an angular profile of an image at the center ($\phi=0.5$ mm) of an emission pupil was obtained for the following four types of optical elements. A diameter of a light receiver is 0.5 mm, which is smaller than a pitch (0.9 mm) of the partially reflecting mirror.

An optical element in which one reflectivity constant partially reflecting mirror is provided on a side close to an incidence portions of a plurality of reflectivity variation partially reflecting mirrors among the partially reflecting mirrors relating to light rays incident on the eyes of an observer was assumed as the optical element of Example 1. Reflectivity of a high reflectivity region of the reflectivity variation partially reflecting mirror was set to 25%, reflectivity of a low reflectivity region was set to 15%, and reflectivity of the reflectivity constant partially reflecting mirror was set to 20%.

An optical element in which two reflectivity constant partially reflecting mirrors are provided on a side close to an incidence portion of a plurality of reflectivity variation partially reflecting mirrors among the partially reflecting mirrors relating to light rays incident on the eyes of the observer was assumed as the optical element of Example 2. Configurations of each partially reflecting mirror are the same as that of the first embodiment.

An optical element in which only a plurality of reflectivity variation partially reflecting mirrors are provided without providing the reflectivity constant partially reflecting mirror was assumed as an optical element of a comparative example. Configuration of the plurality of reflectivity variation partially reflecting mirrors are the same as that of the optical element according to the embodiment illustrated in FIG. 6.

An optical element including a partially reflecting mirror with uniform reflectivity of 20% was assumed as an optical element of related art.

Figure 20:
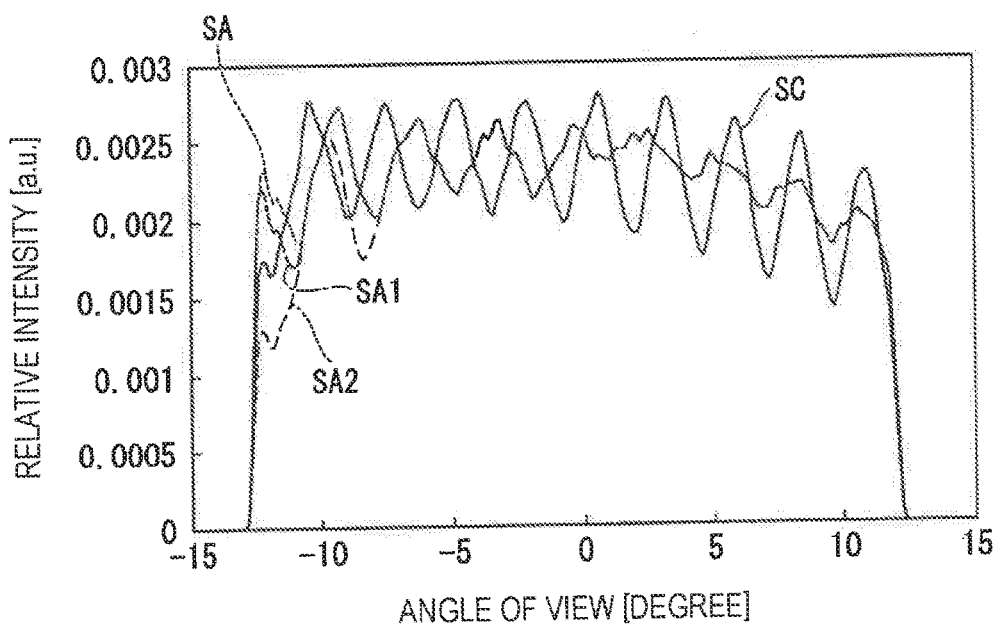
FIG. 20 is a graph illustrating a relationship between an angle of view and a relative intensity of emitted light.

FIG. 20 is a graph illustrating a relationship between an angle of view and a relative intensity of emission light. A horizontal axis of the graph is the angle of view (degree), and a vertical axis is the relative intensity [a.u.] of the emission light. A negative angle of view is an angle of view close to an incident portion with respect to a central axis of an emission pupil, and a positive angle of view is an angle of view far away from the incidence portion with respect to the central axis of the emission pupil. The relative intensity is defined as an intensity of the emission light for each angle of view when an intensity of an image light incident on the optical element is set to 1.

The graph indicated by a symbol SA1 is data of the optical element according to Example 1, the graph indicated by a symbol SA2 is data of the optical element according to Example 2, the graph indicated by a symbol SA is data of the optical element according to a comparative example, and the graph indicated by a symbol SC is data of the optical element of related art.

As illustrated in FIG. 20, in the optical elements of Examples 1 and 2, the relative intensity is slightly lowered in a region of the angle of view of −10 to −15 degrees, but it is found that the same characteristics as the optical element according to the comparative example are obtained. Therefore, it is confirmed that display unevenness can be reduced even when a reflectivity constant partially reflecting mirror is used for a part of a plurality reflectivity variation partially reflecting mirrors.

As illustrated in FIG. 21, in the optical element 36 according to the modification example, occupation area of the high reflectivity regions 31B in the plurality of reflectivity variation partially reflecting mirrors 31 gradationally increases from a side close to the incidence portion 21 toward a side far away from the incidence portion 21, in the same manner as in the first embodiment. In addition, the reflectivity constant partially reflecting mirrors 33 are provided at a position between the first partially reflecting mirror group 34A and the second partially reflecting mirror group 34B, which is a boundary of a reflectivity variation position.

In FIG. 20, one reflectivity constant partially reflecting mirror 33 is provided, but the number of reflectivity constant partially reflecting mirrors 33 is not limited in particular and may be plural. In a case where a plurality of reflectivity constant partially reflecting mirrors 33 are provided, the plurality of reflectivity constant partially reflecting mirrors 33 may be arranged together or separately. In addition, a position at which the reflectivity constant partially reflecting mirror 33 is provided may not be a position between the first partially reflecting mirror group 34A and the second partially reflecting mirror group 34B which is a boundary of a reflectivity variation position, and may be disposed between the first partially reflecting mirror group 34A and a plurality of reflectivity variation partially reflecting mirrors 31 configuring each of the second partially reflecting mirror group 34B.

In addition, instead of the above-described configuration, occupation area of the high reflectivity region 31B in the plurality of reflectivity variation partially reflecting mirrors 31 may linearly increase from a side close to the incidence portion 21 toward a side far away from the incidence portion 21, in the second embodiment. The reflectivity constant partially reflecting mirror 33 may be provided between the plurality of reflectivity variation partially reflecting mirrors 31.

The technical scope of the invention is not limited to the above embodiments, and various modifications can be made without departing from the spirit of the invention.

For example, in the optical element of the aforementioned embodiments, an example is given in which two regions of a high reflectivity region and a low reflectivity region are provided as a plurality of regions having different reflectivity, but the number of reflectivity regions is limited to 2. Three or more regions having different reflectivity may be provided. The more a type of reflectivity increases, the more the uniformity of the image is improved.

In addition, a value of the reflectivity of each region can be freely set by a designer from a value close to 0% to a value close to 100%, depending on an application and the like. Increasing the reflectivity causes a disadvantage that an external image (see-through image) becomes dark, but the display image becomes bright and clear. The reflectivity may be appropriately selected depending on which one of the display image and the external image is desired to be preferentially presented to an observer.

It is not always necessary for all the partially reflecting mirrors included in the optical element to have a plurality of reflectivity regions. For example, even if partially reflecting mirrors at both ends of the optical element are used as the partially reflecting mirrors in which regions having different reflectivity are not provided and the reflectivity is constant, there is no problem in display. Alternatively, among the plurality of reflectivity variation partially reflecting mirrors, a partially reflecting mirror having a constant reflectivity may be disposed between two adjacent reflectivity variation partially reflecting mirrors so as to be parallel to the plurality of reflectivity variation partially reflecting mirrors.

In addition, a region where a boundary (reflectivity variation position) between a high reflectivity region and a low reflectivity region of a partially reflecting mirror having a plurality of reflectivity regions varies and a region where the boundary does not vary may be mixed. In addition, the boundary (reflectivity variation position) between the high reflectivity region and the low reflectivity region may not be clearly distinguished, and the reflectivity may be smoothly varied.

In addition to this, specific configurations of each unit such as the number, a shape, a material, and the like of each configuration elements included in the optical element and the display device is not limited to the above embodiments, and can be appropriately changed. For example, in addition to the above liquid crystal display device, an organic EL device, a combination of a laser light source and a MEMS scanner, or the like may be used as an image forming device.

The entire disclosure of Japanese Patent Application No.: 2016-255070, filed Dec. 28, 2016 and 2017-197434, filed Oct. 11, 2017 are expressly incorporated by reference herein.

What is claimed is:

1. An optical element comprising:
   a plurality of reflectivity variation partially reflecting mirrors that are provided so as to be parallel to each other with a space therebetween, reflect a part of image light incident from an incidence portion, and make the other part of the image light transmit therethrough; and a light-transmittance member that supports the plurality of reflectivity variation partially reflecting mirrors, wherein the light-transmittance member includes an incidence surface on which the image light is incident and an emission surface from which the image light is emitted, wherein each of the plurality of reflectivity variation partially reflecting mirrors is disposed to be inclined with respect to the incidence surface and the emission surface, wherein the plurality of reflectivity variation partially reflecting mirrors include a plurality of regions having different reflectivity in an inclination direction, wherein the plurality of regions of each of the plurality of reflectivity variation partially reflecting mirrors include at least a low reflectivity region that is positioned on a side far away from the emission surface in the inclination direction and a high reflectivity region that is positioned on a side closer to the emission surface than the low reflectivity region in the inclination direction and has a higher reflectivity than reflectivity of the low reflectivity region, and wherein an occupation area of the high reflectivity region in the reflectivity variation partially reflecting mirror that is positioned on a side far away from the incidence portions is larger than an occupation area of the high reflectivity variation region of the reflectivity variation partially reflecting mirror that is positioned on a side close to the incidence portions in the plurality of reflectivity variation partially reflecting mirrors.

2. The optical element according to claim 1, wherein the occupation area of each of the high reflectivity regions in the plurality of reflectivity variation partially reflecting mirrors gradationally increases from the side close to the incidence portion toward the side far away from the incidence portion.

3. The optical element according to claim 1, wherein the occupation area of each of the high reflectivity regions in the plurality of reflectivity variation partially reflecting mirrors linearly increases from the side close to the incidence portion toward the side far away from the incidence portion.

4. The optical element according to claim 1, wherein, when reflectivity of the high reflectivity region is referred to as $R_1$, reflectivity of the low reflectivity region is referred to as $R_2$, and a reflectivity difference parameter $\Phi$ is defined by following equation (1) of $\Phi=(R_1-R_2)/[(R_1+R_2)/2]$, the reflectivity difference parameter $\Phi$ satisfies $0.1<\Phi<0.7$ ... (1).

5. The optical element according to claim 1, further comprising:

a reflectivity constant partially reflecting mirrors that is provided in parallel with each of the plurality of reflectivity variation partially reflecting mirrors.

6. The optical element according to claim 5, wherein the reflectivity constant partially reflecting mirror is disposed so as to be parallel to the plurality of reflectivity variation partially reflecting mirrors between two adjacent reflectivity variation partially reflecting mirrors among the plurality of reflectivity variation partially reflecting mirrors.

7. The optical element according to claim 1, wherein the high reflectivity regions and the low reflectivity regions in the plurality of reflectivity variation partially reflecting mirrors linearly varies.

8. A display device comprising:
an image forming device; and
a light guiding device that guides image light that is generated by the image forming device,
wherein the light guiding device includes an incidence portion on which the image light is incident, a light guiding body which guides the image light incident from the incidence portion, and an emission portion from which the image light is emitted, and
wherein the emission portion includes the optical element according to claim 1.

9. A display device comprising:
an image forming device; and
a light guiding device that guides image light that is generated by the image forming device,
wherein the light guiding device includes an incidence portion on which the image light is incident, a light guiding body which guides the image light incident from the incidence portion, and an emission portion from which the image light is emitted, and
wherein the emission portion includes the optical element according to claim 2.

10. A display device comprising:
an image forming device; and
a light guiding device that guides image light that is generated by the image forming device,
wherein the light guiding device includes an incidence portion on which the image light is incident, a light guiding body which guides the image light incident from the incidence portion, and an emission portion from which the image light is emitted, and
wherein the emission portion includes the optical element according to claim 3.

11. A display device comprising:
an image forming device; and
a light guiding device that guides image light that is generated by the image forming device,
wherein the light guiding device includes an incidence portion on which the image light is incident, a light guiding body which guides the image light incident from the incidence portion, and an emission portion from which the image light is emitted, and
wherein the emission portion includes the optical element according to claim 4.

12. A display device comprising:
an image forming device; and
a light guiding device that guides image light that is generated by the image forming device,
wherein the light guiding device includes an incidence portion on which the image light is incident, a light guiding body which guides the image light incident from the incidence portion, and an emission portion from which the image light is emitted, and
wherein the emission portion includes the optical element according to claim 5.

13. A display device comprising:
an image forming device; and
a light guiding device that guides image light that is generated by the image forming device,
wherein the light guiding device includes an incidence portion on which the image light is incident, a light guiding body which guides the image light incident from the incidence portion, and an emission portion from which the image light is emitted, and
wherein the emission portion includes the optical element according to claim 6.

14. A display device comprising:
an image forming device; and a light guiding device that guides image light that is generated by the image forming device, wherein the light guiding device includes an incidence portion on which the image light is incident, a light guiding body which guides the image light incident from the incidence portion, and an emission portion from which the image light is emitted, and wherein the emission portion includes the optical element according to claim 7.

15. The display device according to claim 8, wherein the emission portion is provided on a surface on a side on which the light guiding body is viewed.

16. The display device according to claim 9, wherein the emission portion is provided on a surface on a side on which the light guiding body is viewed.

17. The display device according to claim 10, wherein the emission portion is provided on a surface on a side on which the light guiding body is viewed.

18. The display device according to claim 11, wherein the emission portion is provided on a surface on a side on which the light guiding body is viewed.

19. The display device according to claim 12, wherein the emission portion is provided on a surface on a side on which the light guiding body is viewed.

20. The display device according to claim 13, wherein the emission portion is provided on a surface on a side on which the light guiding body is viewed.

\* \* \* \* \*